United States Patent [19]
Jubb

[11] Patent Number: 5,811,360
[45] Date of Patent: Sep. 22, 1998

[54] SALINE SOLUBLE INORGANIC FIBRES

[75] Inventor: Gary A. Jubb, Worcestershire, England

[73] Assignee: The Morgan Crucible Company plc, Windsor, England

[21] Appl. No.: 204,385

[22] PCT Filed: Jan. 12, 1994

[86] PCT No.: PCT/GB94/00053

§ 371 Date: Mar. 15, 1994

§ 102(e) Date: Mar. 15, 1994

[87] PCT Pub. No.: WO94/15883

PCT Pub. Date: Jul. 21, 1994

Related U.S. Application Data

[63] Continuation-in-part of Ser. No. 39,086, Apr. 9, 1993, abandoned.

[30] Foreign Application Priority Data

Jan. 15, 1993 [MX] Mexico ..................................... 93 0200
Jul. 9, 1993 [GB] United Kingdom ................... 9314236

[51] Int. Cl.$^6$ .................................................... C03C 13/00
[52] U.S. Cl. ................................ 501/35; 501/36; 501/38; 501/95
[58] Field of Search .................................. 501/95, 31, 37, 501/38, 68, 36, 35

[56] References Cited

U.S. PATENT DOCUMENTS

| | | |
|---|---|---|
| 2,051,279 | 8/1936 | Thorndyke . |
| 2,116,303 | 5/1938 | Coss . |
| 2,155,107 | 4/1939 | Tyler et al. . |
| 2,308,857 | 1/1943 | Bowes . |
| 2,428,810 | 10/1947 | Powell . |
| 2,520,168 | 8/1950 | Powell . |
| 2,520,169 | 8/1950 | Powell . |
| 2,576,312 | 11/1951 | Minnick . |
| 2,577,431 | 12/1951 | Powell . |

(List continued on next page.)

FOREIGN PATENT DOCUMENTS

| | | |
|---|---|---|
| 255803 | 7/1963 | Australia . |
| 588493 | 12/1959 | Canada . |
| 2017344 | 11/1990 | Canada . |

(List continued on next page.)

OTHER PUBLICATIONS

H. Ohta and Y. Suzuki, Chemical Durability of Glasses in the Systems $SiO_2$–$CaO$–$Na_2O$–$R_mO_n$, Ceramic Bulletin, vol. 57, No. 6 pp. 602–604 (1978).
J. Mohr and W. Rowe, Fiber Glass, pp. 4–23, (no date available).
Carlock, D.E., Ceramic Fibres, Refractories Journal, 58(1983)17–20.
Dietrichs & Kronert, Gas Wärme International, 30(1981).
Ofentechnik Stahl & Eisen, 110 (1990)6, 115.
Keramishe Zeitschriften, 33(1981)9, 516.
Extract from DIN V ENV 1094, Part 7, section 7, 9–12.
"Multicomponent Silicate Glasses," Molecular Structure, pp. 28–31 (no date available).

(List continued on next page.)

Primary Examiner—Paul Marcantoni
Attorney, Agent, or Firm—Dean W. Russell; Bruce D. Gray; Kilpatrick Stockton LLP

[57] ABSTRACT

A saline soluble fibre is disclosed that is highly refractory. A vacuum cast preform of the fibre has a shrinkage of 3.5% or less when exposed to 1260° C. for 24 hours. The fibre may comprise CaO, $SiO_2$, MgO optionally $ZrO_2$, optionally less than 0.75 mol % $Al_2O_3$, any incidental impurities amounting to less than 2 mol % in total, and in which the $SiO_2$, excess (defined as the amount of $SiO_2$ calculated as remaining after the above named constituents are crystallised as silicates) exceeds 21.8 mol %, with the proviso that, if the amount of CaO is greater than the sum of the amount of MgO and twice the amount of $ZrO_2$ the calculated ratio of diopside to wollastonite does not lie in the range 1.8 to 5.25. Such fibres are usable at elevated temperatures where refractoriness is of importance and their solubility in saline solution may make the fibres safer than non-soluble fibres.

12 Claims, 1 Drawing Sheet

U.S. PATENT DOCUMENTS

| | | | |
|---|---|---|---|
| 2,823,416 | 2/1958 | Powell . | |
| 3,348,956 | 10/1967 | Ekdahl . | |
| 3,449,137 | 6/1969 | Ekdahl . | |
| 3,799,836 | 3/1974 | Tomic et al. . | |
| 3,887,386 | 6/1975 | Majumdar . | |
| 3,969,121 | 7/1976 | Atkinson | 501/64 |
| 4,036,654 | 7/1977 | Yale et al. . | |
| 4,054,472 | 10/1977 | Kondo et al. . | |
| 4,055,434 | 10/1977 | Chen et al. . | |
| 4,153,439 | 5/1979 | Tomic et al. | 65/2 |
| 4,205,992 | 6/1980 | Mogensen et al. . | |
| 4,238,213 | 12/1980 | Pallo et al. . | |
| 4,251,279 | 2/1981 | Ekdahl . | |
| 4,274,881 | 6/1981 | Langton et al. . | |
| 4,325,724 | 4/1982 | Froberg . | |
| 4,342,581 | 8/1982 | Neubuer et al. . | |
| 4,351,054 | 9/1982 | Olds . | |
| 4,366,251 | 12/1982 | Rapp . | |
| 4,377,415 | 3/1983 | Johnson et al. . | |
| 4,437,192 | 3/1984 | Fujiu et al. . | |
| 4,443,550 | 4/1984 | Kume et al. . | |
| 4,482,541 | 11/1984 | Telfer et al. . | |
| 4,555,492 | 11/1985 | Elkdahl et al. | 501/38 |
| 4,615,988 | 10/1986 | Le Moigne et al. . | |
| 4,661,134 | 4/1987 | Hartung . | |
| 4,678,659 | 7/1987 | Drake et al. . | |
| 4,693,740 | 9/1987 | Noiret et al. . | |
| 4,957,559 | 9/1990 | Tiesler et al. . | |
| 5,023,552 | 6/1991 | Nonami et al. . | |
| 5,055,428 | 10/1991 | Potter . | |
| 5,108,957 | 4/1992 | Cohen et al. | 501/35 |
| 5,121,748 | 6/1992 | Ditz et al. . | |
| 5,217,529 | 6/1993 | Tiesler et al. . | |
| 5,248,637 | 9/1993 | Taneda et al. | 501/35 |
| 5,250,488 | 10/1993 | Thelohan et al. | 501/36 |
| 5,312,806 | 5/1994 | Mogensen | 501/36 |
| 5,332,699 | 7/1994 | Olds et al. | 501/36 |
| 5,401,693 | 3/1995 | Bauer et al. | 501/36 |

FOREIGN PATENT DOCUMENTS

| | | |
|---|---|---|
| 0019600 | 11/1980 | European Pat. Off. . |
| 0076677 | 4/1983 | European Pat. Off. . |
| 0091866 | 10/1983 | European Pat. Off. . |
| 0135449 | 3/1985 | European Pat. Off. . |
| 0 144 349 | 6/1985 | European Pat. Off. . |
| 3917045 | 5/1989 | European Pat. Off. . |
| 399320 | 11/1990 | European Pat. Off. . |
| A-0399320 | 11/1990 | European Pat. Off. . |
| A-399652 | 11/1990 | European Pat. Off. . |
| A-0412878 | 2/1991 | European Pat. Off. . |
| A-0459897 | 12/1991 | European Pat. Off. . |
| A-546984 | 6/1993 | European Pat. Off. . |
| 0585547 | 3/1994 | European Pat. Off. . |
| 0586797 | 3/1994 | European Pat. Off. . |
| 0588251 | 3/1994 | European Pat. Off. . |
| 0591696 | 4/1994 | European Pat. Off. . |
| 63007 | 12/1982 | Finland . |
| 1149289 | 12/1957 | France . |
| 1165275 | 10/1958 | France . |
| 1589410 | 5/1970 | France . |
| 2188026 | 7/1972 | France . |
| A-2662687 | 12/1991 | France . |
| A-2662688 | 12/1991 | France . |
| 1942991 | 3/1970 | Germany . |
| 2748127 | 5/1978 | Germany . |
| 2732387 | 11/1978 | Germany . |
| 3444397 | 6/1986 | Germany . |
| C-3905394 | 9/1989 | Germany . |
| 49-27620 | 3/1974 | Japan . |
| 51-13819 | 2/1976 | Japan . |
| 51-043429A | 4/1976 | Japan . |
| 51-133311 | 11/1976 | Japan . |
| 52-4519 | 1/1977 | Japan . |
| 56-54252 | 5/1981 | Japan . |
| 104380 | 4/1942 | Sweden . |
| 276349 | 7/1970 | U.S.S.R. . |
| 607807 | 5/1978 | U.S.S.R. . |
| 520247 | 4/1939 | United Kingdom . |
| 520 247 | 4/1940 | United Kingdom . |
| 790397 | 2/1958 | United Kingdom . |
| 810 773 | 3/1959 | United Kingdom . |
| 810773 | 3/1959 | United Kingdom . |
| 1 209 244 | 10/1970 | United Kingdom . |
| 1209244 | 10/1970 | United Kingdom . |
| 1273205 | 5/1972 | United Kingdom . |
| 1399556 | 7/1975 | United Kingdom . |
| 1 446 910 | 8/1976 | United Kingdom . |
| 1446910 | 8/1976 | United Kingdom . |
| 2011379 | 7/1979 | United Kingdom . |
| 2081703 | 2/1982 | United Kingdom . |
| 2 083 017 | 3/1982 | United Kingdom . |
| 2083017 | 3/1982 | United Kingdom . |
| 2 122 537 | 1/1984 | United Kingdom . |
| 2122537 | 1/1984 | United Kingdom . |
| 2 150 553 | 7/1985 | United Kingdom . |
| 2164557 | 3/1986 | United Kingdom . |
| WO 98/02394 | 6/1985 | WIPO . |
| WO 86/04807 | 8/1986 | WIPO . |
| WO 87/05007 | 8/1987 | WIPO . |
| WO 89/12032 | 12/1987 | WIPO . |
| 8912032 | 12/1989 | WIPO . |
| WO 90/02713 | 3/1990 | WIPO . |
| WO 90/11756 | 10/1990 | WIPO . |
| WO 91/11403 | of 1991 | WIPO . |
| WO 92/07801 | 5/1992 | WIPO . |
| 9209536 | 6/1992 | WIPO . |
| WO 92/09536 | 6/1992 | WIPO . |
| WO 93/15208 | 8/1993 | WIPO . |
| WO 93/19596 | 10/1993 | WIPO . |
| WO 93/22251 | 11/1993 | WIPO . |
| WO 94/14717 | 7/1994 | WIPO . |
| WO 94/14718 | 7/1994 | WIPO . |

OTHER PUBLICATIONS

"Preparation and Properties of Barium Ferrite Using Hot–Rolled Mill Scale," Chien, Yung–Tsen, et al., *J. Am. Ceram. Soc.*, vol. 72, No. 8, pp. 1328–1332 (1989).

"Advertisement for the Sale of a Fiber Glass Blanket Under the Name *New Super Wool*™," published after Sep. 1986 (on or about Jan. 1987.

"The Dissolution of Abestos Fibres in Water," Gronow, J., *Clay Minerals*, vol. 22, pp. 21–35 (1987).

"Man–Made Vitreous Fibers: An Overview of Studies on Their Biologic Effects," Gross, P., *Am. Ind. Hyg. Assoc. J.*, vol. 47, No. 11, 717–723 (1986).

"Solubility of Abestos and Man–Made Fibers In Vitro and In Vivo: Its Significance in Lung Disease," Morgan, A., et al., *Environmental Research*, vol. 39, pp. 475–484 (1986).

"Corrosion Phenomena in Glass Fibers and Glass Fiber Reinforced Thermosetting Resins," Bledzki, A., et al., *Composites Science & Technology*, Harris and Chou, eds., Elsevier Applied Science Publishers, vol. 23, pp. 263–285 (1985).

"Fiber Toxicology," Leineweber, J.P., *J. Occupational Medicine*, vol. 23, No. 6, pp. 431–434 (1981).

"Development of a Deoiling Process for Recycling Millscale," *Recycling in the Steel Industry, Proceedings of the 1st Process Technology Conference*, vol. 1, pp. 184–187, Washington, D.C., (Mar. 25–26, 1980).

"Effects of Glass Surface Area to Solution vol.Ration on Glass Corrosion," Ethridge, E.C. et al., *Physics and Chemistry of Glasses,* vol. 20, No. 2, pp. 35–40 (1979).

"Glass Compositions for Glass Fibers," Moriya, Ichiro, et al., *Chemical Abstracts,* vol. 89, No. 22, p. 28, Abstract 184615W (1978).

"Glass for Making Glass Fiber," Grigor'ev, V.S., et al., *Chemical Abstracts,* vol. 81, No. 22, Abstract 140076b (1974).

"Dissolution Kinetics of Magnesium Silicates," Luce, R.W., et al., *Geochimica et Cosmochimica Acta.,* vol. 36, pp. 35–50 (1972).

"Elements of Ceramics," Norton, F.H., *Addison–Wesley Publishing Co., Inc.,* p. 39, Reading, Massachusetts (1952).

"The behaviour of mineral fibres in physiological solutions" H. Förster Proceedings of 1982 Who IARC Conference, Copenhagen, vol. 2, pp. 27–55 (1988).

"The reactions of MMMF in a physiological model fluid and in water" R. Klingholz & B. Steinkopf Proceedings of 1982 Who IARC Conference, Copenhagen, vol. 2, pp. 61–86 (1988).

"Solubility of fibres in vitro and in vivo" J.P. Leinweber Proceedings of 1982 Who IARC Conference, Copenhagen, vol. 2, pp. 87–101 (1988).

"In vitro study on siliceous fibres" H. Scholze & R. Condradt Proceedings of 1986 Who IARC Cinference.

"An in vitro Study of the Chemical Durability of Siliceous Fibres" H. Scholze & R. Conradt Annals of Occupational Hygiene 31,4B (1987) 683–692.

"Chemical Durability of asbestos and of man–made mineral fibres in vivo" B. Bellman et al. Aerosol Scientist Vo. 17 No. 3 pp. 341–345, 1986.

Brochure showing Manville Corporation Superwool product (two pages) (no date available).

Brochure showing Morgan Crucilbe Company Superwool product (two pages) (no date available).

Brochure showing Carborundum Company Insulfrax product (sixteen pages) (no date avilable).

"A scale of acidity and basicity in glass" –Glass Industry, Kuan–Han Sun (1948).

"Encyclopedia of Chemical Technology" Kirk & Othmer vol. 9 p. 124 Mineral Wool (1952).

US Bureau of Mines Circular "Mineral Wool" I.C. 6894R (dated Jun. 1939).

"Slag Wools" pp. 111–127 (no date available).

"Multi component silicate glasses" pp. 28–31 no date available).

"Chemical Durability" Chapter 34 of Glass Science and Technology, Elsevier, (1988).

"Thermodynamic model of natural, medieval and nuclear waste glass durability" C.M. Jantzen & M.J. Plodinec Journal of Non–Crystalline Solids 67(1984) 208–233.

Nuclear Waste Glass Durability: 1, Predicting Environmental Response from thermodynamic (Pourbaix) Diagrams Carol M. Jantzen Journal of American Ceramic Society 75[9](1992) 2433–48.

"Prediction of Nuclear waste Glass Durability from Natural Analogs" C.M. Jantzen Advances in Ceramics vol. 20: Nuclear Waste Management II (1986).

"A new approach to predicting the durability of glasses from their chemical compositions", R.G. Newton & A. Paul Glass Technology 21[6](1980) 307–309.

"Glass water interactions" H. Scholze, Journal of Non–Crystalline Solids 102 (1988) 1–10.

"Chemical durability of Glass" Chapter 6 from Chemistry of Glasses 2nd edition A. Paul (1990).

Brochure re Pargas–Platten 1000° C. mineral wool plates (three pages) (no date available).

"Invisci spinning of Filaments via Chemical Jet Stabilization" R.E. Cunningham, L.F. Rakestraw & S.A. Dunn American Instistute of Chemical Engineers Symposium Series No. 180 vol. 74, 20–31 (1978).

"Low–cost Reinforcing Fibres Promise a High Level of performance" S.A. Dunn, Modern Plastics Internationsl, (1989) 50–51.

"Calcium Aluminate glass fibres: drawing from supercooled melts versus inviscid melt spinning" F.T. Wallenberger N.E. Weston, & S.D. Brown, Materials Letters 11 (1991), 229–235.

J. Bauer, et al., "Solubility and Durability of Manmade Mineral Fibers in Physiological Fluids" (nineteen pages; no specific date available.

Standard Test Methods for Fire Tests of Building Construction and Materials (ASTM E119–88) (fourteen pages; (1988).

SALINE SOLUBLE INORGANIC FIBRES

CROSS-REFERENCE TO RELATED APPLICATION

This application is a continuation-in-part of copending U.S. patent application Ser. No. 08/039,086, filed Apr. 9, 1993, now abandoned, under the Patent Cooperation Treaty as application Ser. No. GB93/00085 designating the United States.

FIELD OF THE INVENTION

This invention relates to saline soluble, non-metallic, amorphous, inorganic oxide, refractory fibrous materials. The invention particularly relates to glassy fibres having silica as their principal constituent.

BACKGROUND OF THE INVENTION

Inorganic fibrous materials are well known and widely used for many purposes (e.g. as thermal or acoustic insulation in bulk, mat, or blanket form, as vacuum formed shapes, as vacuum formed boards and papers, and as ropes, yarns or textiles; as a reinforcing fibre for building materials; as a constituent of brake blocks for vehicles). In most of these applications the properties for which inorganic fibrous materials are used require resistance to heat, and often resistance to aggressive chemical environments.

Inorganic fibrous materials can be either glassy or crystalline. Asbestos is an inorganic fibrous material one form of which has been strongly implicated in respiratory disease.

It is still not clear what the causative mechanism is that relates some asbestos with disease but some researchers believe that the mechanism is mechanical and size related. Asbestos of a critical size can pierce cells in the body and so, through long and repeated cell injury, have a bad effect on health. Whether this mechanism is true or not regulatory agencies have indicated a desire to categorise any inorganic fibre product that has a respiratory fraction as hazardous, regardless of whether there is any evidence to support such categorisation. Unfortunately for many of the applications for which inorganic fibres are used, there are no realistic substitutes.

Accordingly there is a demand for inorganic fibres that will pose as little risk as possible (if any) and for which there are objective grounds to believe them safe.

A line of study has proposed that if inorganic fibres were made that were sufficiently soluble in physiological fluids that their residence time in the human body was short; then damage would not occur or at least be minimised. As the risk of asbestos linked disease appears to depend very much on the length of exposure this idea appears reasonable. Asbestos is extremely insoluble.

As intercellular fluid is saline in nature the importance of fibre solubility in saline solution has long been recognised. If fibres are soluble in physiological saline solution then, provided the dissolved components are not toxic, the fibres should be safer than fibres which are not so soluble. The shorter the time a fibre is resident in the body the less damage it can do. H. Förster in The behaviour of mineral fibres in physiological solutions (*Proceedings of* 1982 *WHO IARC Conference*, Copenhagen, Volume 2, pages 27–55 (1988)) discussed the behaviour of commercially produced mineral fibres in physiological saline solutions. Fibres of widely varying solubility were discussed.

International Patent Application No. W087/05007 disclosed that fibres comprising magnesia, silica, calcia and less than 10 wt % alumina are soluble in saline solution. The solubilities of the fibres disclosed were in terms of parts per million of silicon (extracted from the silica containing material of the fibre) present in a saline solution after 5 hours of exposure. The highest value revealed in the examples had a silicon level of 67 ppm. In contrast, and adjusted to the same regime of measurement, the highest level disclosed in the Förster paper was equivalent to approximately 1 ppm. Conversely if the highest value revealed in the International Patent Application was converted to the same measurement regime as the Förster paper it would have an extraction rate of 901,500 mg Si/kg fibre—i.e. some 69 times higher than any of the fibres Förster tested, and the fibres that had the highest extraction rate in the Förster test were glass fibres which had high alkali contents and so would have a low melting point. This is convincingly better performance even taking into account factors such as differences in test solutions and duration of experiment.

International Patent Application No. W089/12032 disclosed additional fibres soluble in saline solution and discusses some of the constituents that may be present in such fibres. Among such constituents are $ZrO_2$ and this document claims (among other things) processes using fibres of composition (in weight %):- $ZrO_2$ 0.06–10%; $SiO_2$ 35–70%; MgO 0–50%; CaO 0–64.5%. However the patent actually discloses a much more limited range of zirconia containing materials and these are listed in Table 1 below ranked on silica content. None of the disclosed zirconia containing compositions were tested for shrinkage and hence usefulness in high temperature applications; all that these fibres were tested for was ability to withstand a fire test and Table 1 indicates that the results of this test were not very predictable; there does appear to be a trend with silica content but no trend is discernible with zirconia content.

European Patent Application No. 0399320 disclosed glass fibres having a high physiological solubility.

Further patent specifications disclosing selection of fibres for their saline solubility are European 0412878 and 0459897. French 2662687 and 2662688. PCT W086/04807 and W 090/02713.

TABLE 1

| Test | $SiO_2$ wt % | CaO wt % | MgO wt % | $Al_2O_3$ wt % | $ZrO_2$ wt % | Fire test Pass/Fail | $SiO_2$ mol % | CaO mol % | MgO mol % | $Al_2O_3$ mol % | $ZrO_2$ mol % |
|---|---|---|---|---|---|---|---|---|---|---|---|
| 174 | 63.5 | 35.55 | 0.33 | 0.88 | 0.21 | P | 61.83 | 37.08 | 0.48 | 0.5 | 0.1 |
| 178 | 60 | 38.3 | 0.48 | 0.36 | 0.54 | — | 58.7 | 40.14 | 0.7 | 0.21 | 0.26 |
| 177 | 59.7 | 38.7 | 0.46 | 0.34 | 0.50 | — | 58.36 | 40.53 | 0.67 | 0.20 | 0.24 |

TABLE 1-continued

| Test | SiO$_2$ wt % | CaO wt % | MgO wt % | Al$_2$O$_3$ wt % | ZrO$_2$ wt % | Fire test Pass/ Fail | SiO$_2$ mol % | CaO mol % | MgO mol % | Al$_2$O$_3$ mol % | ZrO$_2$ mol % |
|---|---|---|---|---|---|---|---|---|---|---|---|
| 176 | 59.5 | 39.1 | 0.42 | 0.31 | 0.42 | — | 58.1 | 40.91 | 0.61 | 0.18 | 0.2 |
| 182a | 59.4 | 349 | 2.06 | 0.38 | 2.31 | P | 58.69 | 36.94 | 3.03 | 0.22 | 1.11 |
| 181 | 59.2 | 36.6 | 1.13 | 0.32 | 0.83 | P | 58.8 | 38.94 | 1.67 | 0.19 | 0.4 |
| 179 | 59.2 | 37 | 0.98 | 0.35 | 0.58 | P | 58.74 | 39.33 | 1.45 | 0.2 | 0.28 |
| 175 | 59.2 | 39.1 | 0.41 | 0.33 | 0.4 | P | 57.99 | 41.03 | 0.6 | 0.19 | 0.19 |
| 183 | 59.05 | 34.84 | 3.08 | 0.3 | 2.65 | P | 57.65 | 36.44 | 4.48 | 0.17 | 1.26 |
| 186 | 59.05 | 36.94 | 2.57 | 0.38 | 3.27 | P | 56.63 | 37.95 | 3.67 | 0.21 | 1.53 |
| 191 | 58.6 | 33.5. | 2.72 | 0.58 | 3.67 | P | 58.21 | 35.65 | 4.03 | 0.34 | 1.78 |
| 192 | 58.4 | 33.2 | 2.59 | 0.65 | 3.69 | P | 58.39 | 33.56 | 3.86 | 0.38 | 1.8 |
| 189 | 58.19 | 35.39 | 3.26 | 0.39 | 3.36 | — | 56.59 | 36.87 | 4.73 | 0.22 | 1.59 |
| 184 | 57.96 | 35.17 | 3.55 | 0.42 | 3.11 | F | 56.44 | 36.69 | 5.15 | 0.24 | 1.48 |
| 190 | 57.86 | 35.66 | 3.22 | 0.36 | 3.37 | F | 56.33 | 37.19 | 4.67 | 0.21 | 1.6 |
| 185 | 57.8 | 34.4 | 3.74 | 0.56 | 3.12 | F | 56.62 | 36.1 | 5.46 | 0.32 | 1.49 |
| 188 | 57.7 | 36 | 3 | 0.2 | 3.3 | P | 56.31 | 37.64 | 4.36 | 0.12 | 1.57 |
| 187 | 56.88 | 36.45 | 4 | 0.32 | 3.3 | — | 54.86 | 37.66 | 5.75 | 0.18 | 1.55 |
| 193 | 56.65 | 31.9 | 3.35 | 3.35 | 4.5 | F | 56.66 | 34.18 | 4.99 | 1.97 | 2.19 |
| 180 | 54.3 | 32.75 | 10.2 | 1.29 | 0.58 | F | 51.41 | 33.22 | 14.39 | 0.72 | 0.27 |
| 182 | 46.85 | 29.2 | 20.6 | 2.03 | 0.84 | F | 42.42 | 28.33 | 27.8 | 1.08 | 0.37 |

The refractoriness of the fibres disclosed in these various prior art documents varies considerably. The maximum service temperature of any of the above mentioned fibres (when used as refractory insulation) is up to 815° C. (1500° F.).

Among saline soluble commercial fibres usable at temperatures higher than 815° C. are SUPERWOOL™ a fibre manufactured by The Morgan Crucible Company plc and which has a maximum use temperature of 1050° C. and a composition of SiO$_2$ 65 wt %; CaO 29 wt %; MgO 5 wt %; Al$_2$O$_3$ 1 wt %. A similar fibre is INSULFRAX™ a fibre made by Carborundum Company which has a continuous use limit of 1000° C. (1832° F.) and which melts at 1260° C. (2300° F.). This has a composition or SiO$_2$ 65 wt %; CaO 31.1 wt %; MgO 3.2 wt %; Al$_2$O$_3$ 0.3 wt % and Fe$_2$O$_3$ 0.3 wt %.

Use of ZrO$_2$ as a constituent in aluminosilicate fibres to provide high temperature resistance is known (see European 0144349). However it is by no means apparent that this effect is transferable to saline soluble fibres and the disclosure of International Patent Application No. WO89/12032 discussed above would tend to suggest that it is not.

The applicant's earlier International Patent Application WO93/15028 (from which this application claims priority) disclosed saline soluble fibres usable at temperatures in excess of 1000° C. but gave no indication that fibres could be used at still higher temperatures. The applicants have found that some of the fibres disclosed in WO93/15028 (e.g. fibre A2-13 from Table 9 of WO93/15028) are in fact usable at temperatures of up to 1260° C. and even higher. In general the applicants have found that fibres of specified compositions (including zirconia containing fibres) are usable at temperatures up to and beyond 1260° C. The applicants have realised that failure of fibres at high temperature occurs primarily upon devitrification of the fibre; if on devitrification insufficient silica is left the fibres will fail through having a shrinkage of greater than 3.5%. Accordingly the applicants have looked to what materials are formed on devitrification.

In the following where reference is made to a saline soluble fibre this is to be taken as meaning a fibre having a total solubility of greater than 10 ppm in saline solution as measured by the method described below, and preferably having much higher solubility.

SUMMARY OF THE INVENTION

A saline soluble fibre is disclosed that is highly refractory. A vacuum cast preform of the fibre has a shrinkage of 3.5% or less when exposed to 1260° C. for 24 hours. The fibre may comprise CaO, SiO$_2$, MgO, optionally ZrO$_2$, optionally less than 0.75 mol % Al$_2$O$_3$, any incidental impurities amounting to less than 2 mol % in total, and in which the SiO$_2$ excess (defined as the amount of SiO$_2$ calculated as remaining after the above named constituents are crystallised as silicates) exceeds 21.8 mol %. Such fibres are usable at elevated temperatures where refractoriness is of importance and their solubility in saline solution may make the fibres safer than non-soluble fibres.

DETAILED DESCRIPTION

Figure 1:
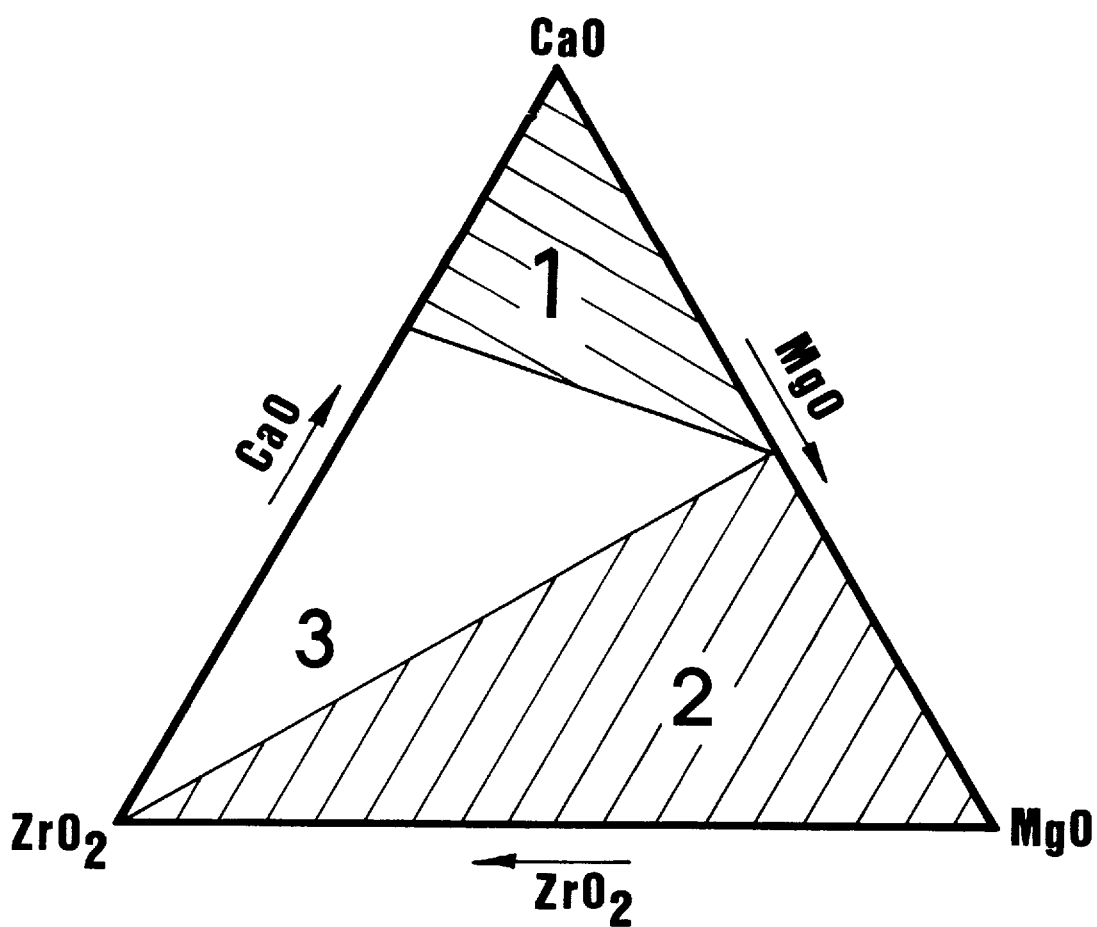
FIG. 1 shows a three axis composition diagram for the constituents CaO, MgO, and ZrO$_2$; this diagram omits all other constituents so that the sum of CaO, MgO, and ZrO$_2$, at all points is 100%. Silica is in excess at all points as described below.

For fibres where CaO>MgO+2ZrO$_2$ all of the MgO is bound as CaO.MgO.2SiO$_2$; all of the ZrO$_2$ is bound as 2CaO.ZrO$_2$.4SiO$_2$; and any excess CaO is bound as CaSiO$_3$. These fibres lie in region 1 of FIG. 1 and in the following are referred to as excess CaO fibres.

For fibres where MgO>CaO all of the CaO is bound as CaO.MgO.2SiO$_2$; all of the ZrO$_2$ is bound as ZrO$_2$.SiO$_2$; and the excess MgO is bound as MgO.SiO$_2$. These fibres lie in region 2 of FIG. 1 and in the following are referred to as excess MgO fibres.

For the fibres in region 3 of FIG. 1 where CaO>MgO and CaO<MgO+2ZrO$_2$, all of the MgO is bound as CaO.MgO.2SiO$_2$; the rest of the CaO is bound as 2CaO.ZrO$_2$.4SiO$_2$, and the excess ZrO$_2$, is bound as ZrO$_2$.SiO$_2$. These fibres are referred to in the following as excess ZrO$_2$, fibres.

The applicants have defined a term "SiO$_2$ excess" which indicates the amount of silica left once the above mentioned constituents (CaO, MgO, and ZrO$_2$) have crystallised. The value of SiO$_2$ excess is calculated by subtracting from the total quantity of silica present that amount that should crystallise as silicates with the other constituents CaO, MgO, and $ZrO_2$ assuming all of the CaO, MgO, and $ZrO_2$, crystallise as the materials mentioned above. In most of the compositions studied alumina is present to some extent and so the applicants also assume that alumina crystallises as $Al_2O_3.SiO_2$ and to calculate $SiO_2$ excess this quantity is subtracted also. Only the above named constituents are used in calculating the $SiO_2$ excess as other chemical constituents are present in only small amounts. For other chemical constituents similar considerations apply. It has been found by the applicants that when the $SiO_2$ excess is greater than 21.8 mol % the fibres tend to have a resistance to temperature of up to 1260° C.

DETAILED DESCRIPTION

The applicants have found that for the excess CaO compositions the situation is complicated by a eutectic formed between the two crystalline materials diopside ($CaO.MgO.2SiO_2$) and wollastonite ($CaSiO_3$) that has a damaging effect on high temperature resistance. Thus the present invention excludes those excess CaO compositions that have a calculated diopside to wollastonite ratio in the range from more than that of fibre E32 (see Table 2) to 5.25.

The physical basis for the importance of $SiO_2$, excess may be that it indicates how much silica is left to maintain a glassy phase on crystallisation of the other constituents as silicate materials. Further, the silicate materials that form on devitrification may become liquid or flow at 1260° C. so causing shrinkage.

The quantity of potentially fluxing constituents such as alkali metals and other incidental impurities (e.g. iron oxides) should be kept low.

Accordingly the present invention provides a refractory fibre for which a vacuum cast preform of the fibre has a shrinkage of 3.5% or less when exposed to 1260° C. for 24 hours and comprising CaO, $SiO_2$, MgO, optionally $ZrO_2$, and/or less than 0.75 mol % $Al_2O_3$, any incidental impurities amounting to less than 2 mol % in total, and in which the $SiO_2$, excess (defined as the amount of $SiO_2$ calculated as remaining after the above named constituents are crystallised as silicates) exceeds 21.8 mol %. with the proviso that, if the amount of CaO is greater than the sum of the amount of MgO and twice the amount of $ZrO_2$ the calculated ratio of diopside to wollastonite does not lie in the range from more than that of fibre E32 (see Table 2) to 5.25.

The applicants have also found that for those fibres that have a satisfactory shrinkage at 1260° C. the saline solubility of the fibres produced appears to increase with increasing amount of MgO present whereas $ZrO_2$, and $Al_2O_3$ are detrimental to solubility. The invention therefore also provides preferred saline soluble fibres of the composition specified above and in which the MgO excess [defined as MgO—($ZrO_2+Al_2O_3$)] is greater than 10 mol %, such fibres tending to have a total solubility of $MgO+SiO_2+CaO$ of greater than 50 ppm (see below for measurement details). More preferably the MgO excess is greater than 11.2 mol % such fibres tending to have extremely high solubility of about 100 ppm or more. Yet more advantageously, so far as solubility is concerned, the MgO excess is greater than 15.25 mol %; all of the fibres measured having an MgO excess greater than 15.25 mol % had solubilities in excess of 100 ppm.

As a consequence of inventing these fibres the invention also provides a saline soluble fibre characterised in that a vacuum cast preform of the fibre has a shrinkage of 3.5% or less when exposed to 1260° C. for 24 hours.

The applicants have investigated for their saline solubility and refractoriness, a range of compositions based on CaO/$MgO/SiO_2$ fibres with additional constituents $Al_2O_3$, $ZrO_2$, and $TiO_2$. These fibres were formed by blowing the molten constituents from a melt stream in a conventional manner but the invention is not limited to blown fibres and also encompasses fibres formed by spinning or any other means.

Tables 2 & 3 show the results of these tests. Table 2 indicates for each the linear shrinkages at 800°, 1000°, 1200°, and 1260° C. (not all samples measured at every temperature); weight percent composition; mole percent composition (based on the constituents CaO, MgO, $SiO_2$ $Al_2O_3$, $ZrO_2$, and $TiO_2$); $SiO_2$ excess (as defined above) and, for the CaO excess fibres, the calculated diopside to wollastonite ratio. Table 3 indicates for each the weight percent composition: mole percent composition (based on the constituents CaO, MgO, $SiO_2$, $Al_2O_3$, $ZrO_2$, and $TiO_2$); solubilities of various constituents; and MgO excess (as defined above) Each sample that has a satisfactory shrinkage of 3.5% or less at 1260° C. is indicated by a composition shown in bold. Those compositions that fail to meet the shrinkage criterion are indicated in italics. Other compositions are shown falling within the described ranges but for which the high temperature shrinkage was not measured; these compositions are indicated in plain text. Those compositions where a fibre could not be made or where the fibre was of too poor a quality for the solubility to be measured are indicated with X's.

A pattern emerges which is described below with reference to Table 2.

The fibres above and including line A all have a $SiO_2$ excess of less than 21.8 mol % and all (where measured) fail the shrinkage criterion that a vacuum cast preform of the fibre has a shrinkage of less than 3.5% when exposed to 1260° C. for 24 hours.

The fibres above and including line B and below line A all have a $TiO_2$ content of greater than 1.25 mol % and all rail the shrinkage criterion.

The fibres above and including line C and below line B all have a $Al_2O_3$ content of greater than 0.75 mol % and all fail the shrinkage criterion.

The fibres below line C are grouped according to their relative amounts of CaO, MgO, and $ZrO_2$ (i.e. as to their positions in FIG. 1)

The fibres above and including line D and below line C are the excess MgO fibres (region 2 of FIG. 1) and are sorted on $SiO_2$ excess.

The fibres above and including line E and below line D are the excess $ZrO_2$ fibres (region 3 of FIG. 1) and are sorted on $SiO_2$ excess.

The fibres below line E are the excess CaO fibres and are sorted on the diopside to wollastonite ratio.

The fibres above and including line F and below line E are excess CaO fibre for which the diopside to wollastonite ratio is greater than 5.25.

The fibres above and including line G and below line F are excess CaO fibre for which the diopside to wollastonite ratio is less than 5.25 but greater than 18.

The fibres below line G are excess CaO fibre for which the diopside to wollastonite ratio is less than 1.8.

Looking first to the excess MgO fibres most pass the shrinkage criterion at 1260° C. (where tested). B7D, BZ-440C, B7C, and BZ-4150C all contain relatively high levels of $Fe_2O_3$ (1.1 wt % for B7D and 0.6 wt % for the others).

D3 and D8 contain relatively high levels (0.71 mol % and 0.74 mol %) of $TiO_2$ and it may be that this, in combination with other impurities, has led to failure. It should be noted that D9 has 0.65 mol % $TiO_2$ and has a satisfactory shrinkage.

BZ-440A, B7A, BZ-4150A, and BZ-560B have varying amounts of $Na_2O$ present (0.3–1.0 wt %) and this may contribute to their failure.

BZ-4150B has a $Al_2O_3$ content of 0.64 mol % and fails the shrinkage criterion. This should be contrasted with BZ-4150 which has a similar composition but with only 0.06 mol % $Al_2O_3$ and which passes the shrinkage criterion. In further contract BZ-560E has an alumina content of 0.62 mol % and passes the shrinkage criterion; this composition has a much higher $ZrO_2$ content than BZ-4150B and the applicant believe that the presence of $ZrO_2$ allows the fibres to tolerate much higher levels of impurities than would otherwise be the case.

D3 only just fails with a shrinkage of 3.8% and B19 only has a shrinkage of 3.6% at 1260° C. and both may in fact be errors in measurement.

Looking next to the excess $ZrO_2$ fibres all apart from BZ-407, BZ-429 and BZ-430 pass the shrinkage criteria at 1260° C. (where tested). These results may indicate that the incidental impurities (shown as "Others" in Table 2) are having an effect as BZ-429 and BZ-430 show high levels of impurities (1.1 and 0.9 wt % respectively) that on analysis included 0.4 and 0.3 wt % respectively of $Na_2O$. BZ430 only just failed the shrinkage criterion (3.7% shrinkage) and this may be due to error in measurement.

Turning now to the excess CaO fibres the pattern is clear but not exact. Fibres that have a diopside to wollastonite ratio of between 5.25 and 1.8 fail the shrinkage criterions. Those with a diopside to wollastonite ratio outside this range trend to pass. The fit is not exact and the fibres that fail to meat the shrinkage criterion are the following.

Among the excess CaO fibres with a diopside to wollastonite ratio in excess of 5.25 those that fail the shrinkage criterion include BZ-418 and BZ-29 which have low enough shrinkages that they may be the result of experimental error and these fibres may in fact have a satisfactory shrinkage.

BZ-42, B13, BZ-422, BZ-417, and BZ-416 also fail and although initial indicators were that this had something to do with the level of CaO this now appears to be incorrect. The failure to meet the shrinkage criterion may be due to the presence of fluxing constituents or otherwise. A possible reason for failure of BZ-29 and BZ-421 may be their high $Al_2O_3$ content (0.55 and 0.51 mol % respectively) acting alone or in combination with impurities.

For the excess CaO fibres having a diopside to wollastonite ratio of less than 1.8 the only fibre proven to fail was fibre E24 which although passing a 1260° C. test failed a 1200° C. test. This result may have been due to experimental error, fluxing components, or otherwise.

Table 3 shows the solubilities of the fibres shown in Table 2 but ranked on MgO excess. Although by no means exact it can be seen that there is a trend in total solubility that closely follows MgO excess.

In any event the trend appears to be that excess CaO fibres perform poorly (perhaps due to the formation of $CaSiO_3$ which is not formed in excess MgO or excess $ZrO_2$ fibres) whereas excess MgO and excess $ZrO_2$ fibres perform better. Taken to the extreme this would indicate that a high MgO, low CaO, low $ZrO_2$, low $Al_{2O3}$ fibre would have very high solubility and low shrinkage. However the applicant's experience is that such fibres are difficult to form (see Compositions A2-33, A2-32, A2-28). Equally fibres that are too high in $SiO_2$ are difficult or impossible to form. The exact boundaries are difficult to ascertain and this invention only encompasses fibres that meet the above stated shrinkage requirements.

The applicants have tested some fibres to higher temperatures.

Fibres BZ-400, BZ-440, BZ-48, and BZ-54 were tested to 1350° C. and all failed having shrinkages in excess of 20%.

Fibres BZ-400, BZ-36, BZ-46, and BZ-61 were tested to 1300° C. and had shrinkages respectively, of 6.2%, 17.9%, 19.6%, and 3.1%. BZ-61 is in the excess MgO region and the applicants surmise (since $2CaO.ZrO_2.4SiO_2$ is not formed in this region) that it is this constituent that causes failure at 1300° C.

The fact that fibre shrinkage is so dependent on temperature (the fibres failing over such short temperature ranges as 1260° C. to 1300° C. and 1300° C. to 1350° C.) is a clue as to how experimental errors may arise. In a typical experimental furnace running at a nominal 1260° C. temperatures can easily range from 1250° C. to 1270° C. both physically (from front to back or centre to wall of furnace) and in time (as the furnace controller supplies or stops current to the furnace). A 20° C. temperature difference could easily move a sample from a temperature at which it passes to one at which it fails the 3.5% shrinkage criterion. As mentioned above this may explain the shrinkages of just over 3.5% found for compositions B19, D3, BZ-430, BZ-418 and BZ-29, During the shrinkage tests some of the sample preforms used were also inspected to ascertain whether they reacted adversely with the ceramic boards (alumina or mullite boards) on which they rested during the test. It was found that the excess CaO fibres with a diopside to wollastonite ratio of less than 1.8 reacted particularly badly with mullite boards and further that due to acicular crystal growth the fibres tended to lose strength.

The following describes in detail the methods used to measure shrinkage and solubility.

Shrinkage was measured by proposed ISO standard ISO/TC33/SC2/N220 (equivalent to British Standard BS 1920, part 6,1986) with some modifications to account for small sample size. The method in summary comprises the manufacture of vacuum cast preforms, using 75 g of fibre in 500 $cm^3$ of 0.2% starch solution, into a 120×65 mm tool. Platinum pins (approximately 0.1–0.3 mm diameter) were placed 100×45 mm apart in the 4 corners. The longest lengths (L1 & L2) and the diagonals (L3 & L4) were measured to an accuracy of ±5 $\mu$m using a travelling microscope. The samples were placed in a furnace and ramped to a temperature 50° C. below the test temperature at 400° C./hour and ramped at 120° C./hour for the last 50° C. to test temperature and left for 24 hours. The shrinkage values are given as an average of the 4 measurements.

It should be noted that although this is a standard way of measuring shrinkage of fibre it has an inherent variability in that the finished density of the preform may vary depending on casting conditions. Further it should be noted that fibre blanket will usually have a hither shrinkage than a preform made of the same fibre. Accordingly the 3.5% figure mentioned in this specification is likely to translate as a higher shrinkage in finished blanket.

The applicants have looked to the various incidental impurities that can occur in inorganic oxide refractory fibres (e.g. alkali oxides and iron oxide) and have found that the impurity levels that can be tolerated vary according to the proportions of the main constituents of the fibre. Fibres containing high levels of $ZrO_2$ for example can tolerate higher levels of $Na_2O$ or $Fe_2O_3$ than fibres with low levels of $ZrO_2$. Accordingly the applicants propose a maximum level of incidental impurities of 2 mol %, the maximum level that will be tolerable will however vary as mentioned above.

Solubility was measured by the following method.

The fibre was first chopped −2.5 g of fibre (deshotted by hand) was liquidised with 250 cm³ of distilled water in a domestic Moulinex (Trade Mark) food blender for 20 seconds. The suspension was then transferred to a 500 cm³ plastic beaker and allowed to settle after which as much liquid as possible was decanted and the remaining liquid removed by drying in an oven at 110° C.

The solubility test apparatus comprised a shaking incubator water bath, and the test solution had the following composition:

| Compound | Name | Grams |
|---|---|---|
| NaCl | Sodium chloride | 6.780 |
| $NH_4Cl$ | Ammonium chloride | 0.540 |
| $NaHCO_3$ | Sodium bicarbonate | 2.270 |
| $Na_2HPO_4 \cdot H_2O$ | Disodium hydrogen phosphate | 0.170 |
| $Na_3C_6H_5O_7 \cdot 2H_2O$ | Sodium citrate dihydrate | 0.060 |
| $H_2NCH_2CO_2H$ | Glycine | 0.450 |
| $H_2SO_4$ s.g. 1.84 | Sulphuric acid | 0.050 |

The above materials were diluted to 1 liter with distilled water to form a physiological-like saline solution.

0.500 grams±0.0003 grams of chopped fibre was weighed into a plastic centrifuge tube and 25 cm³ of the above saline solution added. The fibre and saline solution was shaken well and inserted into the shaking incubator water bath maintained at body temperature (37° C.±1° C.). The shaker speed was set at 20 cycles/minute.

After the desired period (usually 5 hours or 24 hours) the centrifuge tube was removed and centrifuged at 4500 revs/minute for approximately 5 minutes. Supernatant liquid was then drawn off using a syringe and hypodermic needle. The needle was then removed from the syringe, air expelled from the syringe, and the liquid passed through a filter (0.45 micron cellulose nitrate membrane filter paper [WCN type from Whatman Labsales Limited] into a clean plastic bottle. The liquid was then analysed by atomic absorption using a Thermo Jarrell Ash Smith-Hiefje II machine.

The operating conditions were as follows using a nitrous oxide and acetylene flame:

| ELEMENT | WAVELENGTH (nm) | BAND WIDTH | CURRENT (mA) | FLAME |
|---|---|---|---|---|
| Al | 309.3 | 1.0 | 8 | Fuel Rich |
| $SiO_2$ | 251.6 | 0.3 | 12 | Fuel Rich |
| CaO | 422.7 | 1.0 | 7 | Fuel Lean |
| MgO | 285.2 | 1.0 | 3 | Fuel Lean |

The procedure and standards adopted for determining the above elements were as set out below.

$SiO_2$ can be determined without dilution up to 250 ppm concentration (1 ppm 1 mg/Liter). Above this concentration an appropriate dilution was made volumetrically. A 0.1% KCl solution (0.1 g in 100 cm³) was added to the final dilution to prevent ionic interference. NB If glass apparatus is used, prompt analysis is necessary.

From a stock solution of 1000 ppm pure ignited silica (99.999%) (fused with $Na_2CO_3$ at 1200° C. for 20 minutes in a platinum crucible (0.2500 g $SiO_2$/2 g $Na_2CO_3$) and dissolved in dilute hydrochloric acid (4 molar) made up to 250 cm³ with distilled water in a plastic volumetric flask) the following standards were produced:-

| STANDARD (ppm $SiO_2$) | STOCK SOLUTION (cm³) |
|---|---|
| 10.0 | 1.0 |
| 20.0 | 2.0 |
| 30.0 | 3.0 |
| 50.0 | 5.0 |
| 100.0 | 10.0 |
| 250.0 | 25.0 |

Add 0.1% KCl to each standard before making to 100 cm³.

Aluminium may be measured directly from the sample without dilution. Standards of 1.0, 5.0 and 10.0 ppm Al may be used. For calibration readings are multiplied by 1.8895 to convert from Al to $Al_2O_3$.

A standard Al atomic absorption solution (e.g. BDH 1000 ppm Al) was bought and diluted using an accurate pipette to the desired concentration. 0.1% KCl was added to prevent ionic interference.

Calcium may require dilutions on the sample before determination can be carried out (i.e.×10 and ×20 dilutions). Dilutions must contain 0.1% KCl.

A standard Ca atomic absorption solution (e.g. BDH 1000 ppm Ca) was diluted with distilled water and an accurate pipette to give standards of 0.5, 4.0 and 10.0 ppm. 0.1% KCl is added to prevent ionic interference. To convert readings obtained from Ca to CaO a factor of 1.4 was used.

Magnesium may require dilutions on the sample before determinations can be made (i.e.×10 and ×20). Add 0.1% KCl to each dilution. To convert Mg to MgO multiply by 1.658.

A standard Mg atomic absorption solution (e.g. BDH 1000 ppm Mg) was diluted with distilled water and an accurate pipette to give standards of 0.5, 1.0 and 10.0 ppm Mg. 0.1% KCl was added to prevent ionic interference.

All stock solutions were stored in plastic bottles.

The above has discussed resistance to shrinkage of preforms exposed to 1260° C. for 24 hours. This is an indication of the maximum use temperature of a fibre. In practice fibres are quoted for a maximum continuous use temperature and a higher maximum exposure temperature. It is usual in industry when selecting a fibre for use at a given temperature to choose a fibre having a higher continuous use temperature than that nominally required for the intended use. This is so that any accidental increase in temperature does not damage the fibres. It is quite usual for a margin of 100° to 150° C. to be given. Accordingly this invention extends to use of the claimed fibres at elevated temperatures (i.e. at temperatures where the refractoriness of fibres is important) and not just to use at 1260° C.

In selecting a fibre a balance has to be struck between refractoriness of the fibre and saline solubility of the fibre. For example the applicants have found the best high solubility fibre (total solubility greater than 100 ppm) is probably composition B7 as that has a shrinkage of 2.70% at 1260° C. In contrast the best refractory fibre is probably BZ-560 which has a shrinkage of only 2.1% at 1260° C. but has a total solubility of only 27 ppm. Although there are other fibres with a lower shrinkage this fibre also has the property of retaining in large part its resilience on firing to 1260° C.—many of the fibres become rigid after firing due to crystallisation and sintering. It appears that high levels of $ZrO_2$ help to overcome this (BZ-560 has 7.64 mol % $ZrO_2$) but at the same time reduce solubility.

It will be evident from the above that incidental impurity levels are preferably kept as low as possible. The applicants surmise that as the various crystalline materials crystallise from the fibres impurities migrate to the grain boundaries and concentrate there. Thus a small impurity can have a very large effect.

TABLE 2

| Comp. | 100 C. | 1000 C. | 1200 C. | 1260 C. | Composition Wt % CaO | MgO | ZrO2 | Al2O3 | TiO2 | SiO2 | Others | Composition mol % CaO | MgO | ZrO2 | Al2O3 | TiO2 | SiO2 | SiO2 Excess | Diopside Wollaxtonite Ratio | Comments |
|---|---|---|---|---|---|---|---|---|---|---|---|---|---|---|---|---|---|---|---|---|
| CASIO | 0.6 | | | | 50.8 | | | | | 23.6 | | 58.82 | | | 13.67 | | 23.51 | -48.98 | | |
| BZ-14 | 36.6 | 10.7 | | | 27.3 | 9.9 | 10 | 24.6 | | | 0.7 | 29.00 | 14.74 | 4.87 | 0.24 | | 51.15 | -2.57 | | |
| CAS4 | 0.3 | 31 | 3 | | 33.7 | 19.7 | 0.4 | 0.4 | | | 42.3 | 0.3 | 24.38 | 0.69 | 0.11 | | 31.96 | 49.50 | -1.12 | |
| BZ-13 | 14.1 | | | 10.3 | 32 | 5.1 | 10 | 0.2 | | 50.9 | 0.7 | 35.00 | 7.76 | 4.98 | 0.50 | | 49.77 | -1.05 | | |
| 71 | | 31.7 | | | 24.4 | 19.68 | | 0.3 | | 34.68 | | 28.44 | 26.67 | | 0.11 | 25.12 | 0.07 | -0.45 | | |
| 765 | | 34.2 | | | 3.9 | 33.07 | | 0.2 | | 37.78 | | 3.62 | 41.25 | | 1.08 | 30.04 | | | | |
| BZ-24 | 20.9 | 40.2 | | 49.1 | 22.2 | 9.9 | 13 | 2.12 | | 31.2 | 0.8 | 24.46 | 13 | 18 | 7.52 | 0.18 | 34.22 | 52.66 | 0.68 | |
| BZ-23 | 6.4 | 39.3 | | | 26.3 | 5 | 14.9 | 0.3 | | 31.4 | 0.8 | 29.93 | 7.86 | 7.66 | 0.31 | | 30.92 | 0.77 | | |
| 734 | | 34.9 | | | 26.62 | 17.05 | 0.05 | 1 | | 36.38 | | 25.66 | 22.87 | 0.02 | 0.35 | | 37.14 | 1.81 | | |
| 973 | | 41.7 | | | 24.45 | 16.81 | 0.05 | 0.5 | | 36.18 | | 24.91 | 23.35 | 0.02 | 0.27 | | 32.73 | 4.26 | | |
| 972 | | 10.1 | | | 23.92 | 17.86 | 0.05 | 0.74 | | 36.82 | | 23.36 | 21.79 | 0.02 | 0.40 | | 37.07 | 4.47 | | |
| BZ-27 | 2.6 | | | 19 | 23.8 | 5.1 | 14.8 | 0.4 | | 33.9 | 0.7 | 27.00 | 8.03 | 7.64 | 0.25 | | 37.07 | 6.49 | | |
| BZ-10 | 27.8 | | | 36.7 | 27.1 | 10 | 5 | 0.4 | | 56 | 0.6 | 28.29 | 14.53 | 2.88 | 0.35 | | 54.58 | 6.77 | | |
| 708 | 3 | 7 | 1.1 | | | 42.79 | 0.77 | | | 55.22 | | | 44.85 | 1.12 | | | | | 8.05 | |
| A2-19 | | 4.7 | | | 18.48 | 19.74 | | 0.54 | | 38.71 | | 18.79 | 27.18 | | 0.29 | | 34.24 | 54.03 | | |
| A2-18 | | 36.2 | | | 26.39 | 13.01 | | 0.66 | | 56.96 | | 26.83 | 18.48 | | 0.37 | | 34.90 | 8.47 | | |
| BZ-28 | 5.9 | | | | 19.4 | 9.9 | 15.1 | 0.3 | | 54.5 | 0.6 | 21.30 | 13.12 | 7.55 | 0.18 | | 35.83 | 8.59 | | |
| BZ-3 | 34.7 | 0.3 | | | 36.07 | 4.44 | 1.46 | 0.38 | | 35.99 | | 37.77 | 6.47 | 0.70 | 0.33 | | 35.80 | 8.62 | | |
| BZ-9 | 31.5 | | | 43.9 | 31.8 | 5 | 5.1 | 0.6 | | 36 | 0.6 | 31.95 | 7.43 | 2.48 | 0.33 | | 35.80 | 8.76 | | |
| B3-76 | 26.6 | 59.8 | | | 30.5 | 9.44 | 0.62 | | 56.92 | | 31.39 | 13.52 | | 0.35 | | 34.74 | 9.48 | 9.12 | | |
| BZ-21 | 3.1 | 11.9 | | 16.8 | 22.5 | 3 | 13.2 | 0.5 | | 56.4 | 0.7 | 23.06 | 7.82 | 7.77 | 0.19 | | 39.36 | 10.55 | | |
| BZ-12 | 10.7 | 18.9 | | 14.8 | 18.59 | 18.78 | 0.05 | 0.48 | | 60.2 | | 18.97 | 25.82 | 0.02 | 0.26 | | 35.53 | 11.06 | | |
| A2-24 | 7.4 | | | | 21.3 | 9.7 | 10.2 | 0.3 | | 57.8 | 0.8 | 22.77 | 14.42 | 4.96 | 0.18 | | 37.67 | 11.17 | | |
| 952 | 12.5 | 3.3 | | | 13.62 | 22.74 | 0.08 | 0.31 | | 61.58 | | 19.25 | 30.79 | 0.04 | 0.17 | | 33.76 | 11.51 | | |
| 714 | | 12.8 | | | 21.6 | 15.65 | 0.11 | 1.5 | | 39.83 | | 21.58 | 21.73 | 0.03 | 0.82 | | 11.60 | | | |
| BZ-11 | 1.2 | 0.7 | | | 32 | 8.27 | | | | 59.05 | | 32.45 | 11.67 | | | | 35.89 | 11.78 | | |
| 660 | 6.6 17.2 | | 22 | | 5 | 10.2 | 0.4 | 1.15 | 37.4 | 0.8 | 28.60 | 7.39 | 5.07 | 0.24 | 0.66 | 38.49 | 11.92 | | | |
| 712 | 3.4 | 24.7 | | | 34.65 | 4.83 | | 0.06 | | 37.74 | | 36.33 | 7.01 | | 0.03 | | 36.20 | 12.40 | | |
| B3-20 | | 4.4 | | | 35.39 | 4.61 | 0.07 | 0.81 | | 57.54 | | 27.04 | 8.71 | 0.03 | 0.52 | | 36.21 | 12.43 | | |
| A2-25 | | 30.9 | | | 32.7 | 6.07 | | 0.38 | | 37.37 | | 34.28 | 8.83 | | 0.18 | | 56.24 | 12.68 | | |
| BZ-25 | | 6.1 | 1.6 | 11.6 | 10.99 | 24.18 | 0.17 | 0.3 | | 62.36 | 0.7 | 10.66 | 32.64 | 0.03 | 0.19 | | 56.48 | 12.97 | | |
| 694 | 2.7 | 3.9 | | | 20.7 | 5.2 | 15.5 | 0.27 | | 57.3 | | 23.33 | 8.16 | 7.96 | 0.18 | | 60.34 | 13.09 | | |
| A2-11 | 1.9 | 1.6 | | | 33.1 | 6.02 | 0.17 | 0.25 | | 58.39 | | 34.41 | 8.71 | 0.8 | 0.15 | | 56.65 | 13.23 | | |
| B3-21 | 1.1 | 1.8 | | | 24.28 | 13.24 | 0.8 | 0.73 | | 60.32 | | 24.48 | 18.57 | 0.04 | 0.14 | | 56.77 | 13.51 | | |
| 692 | | 30.3 | | | 36.62 | 2.43 | 0.09 | 0.13 | | 57.98 | | 38.96 | 3.60 | 0.04 | 0.43 | | 56.98 | 13.92 | | |
| B8 | 2.8 | 2.1 | | | 34.34 | 5.44 | 0.17 | 0.2 | | 59.82 | | 35.08 | 7.73 | 0.08 | 0.07 | | 57.04 | 14.00 | | |
| BZ-32 | 7.6 | 2.9 | | 6.9 | 18.8 | 17.9 | 0.3 | 0.4 | | 63 | 0.2 | 18.30 | 24.24 | 0.13 | 0.11 | | 57.23 | 14.46 | | |
| E21 | 1.4 | 20.7 | | 21.3 | 17.1 | 9.8 | 13.7 | 0.2 | | 56.7 | 0.7 | 18.83 | 15.02 | 7.62 | 0.24 | | 36.24 | 14.67 | | |
| B3-25 | | 3.4 | | | 39.1 | 0.7 | | 0.6 | | 37.2 | 0.5 | 41.28 | 1.03 | | 0.33 | | 57.33 | 14.70 | | |
| 586 | 1.6 | 2.3 | | | 28.15 | 9.32 | | 0.41 | | 59.53 | | 29.08 | 13.25 | | 0.27 | | 37.40 | 14.80 | | |
| A2-14 | | 1.9 | | | 35.03 | 3.9 | | 0.3 | | 58.65 | | 36.77 | 5.69 | | 0.08 | | 57.46 | 14.92 | | |
| A2-35 | 7.1 | 1.8 | | | 25.3 | 11.66 | 0.16 | 0.28 | | 60.74 | | 25.70 | 16.48 | 0.07 | 0.16 | | 57,59 | 15.11 | | |
| 924 | 3 | 7.3 | | | 8.88 | 24.82 | 0.47 | 0.29 | | 64.32 | | 8.36 | 33.37 | 0.21 | 0.25 | | 37.71 | 15.41 | | |
| 696 | 1.4 | 0.3 | | | 19.78 | 14.54 | 0.06 | 2.57 | | 61.32 | | 19.99 | 20.44 | 0.30 | 1.43 | | 57.84 | 15.68 | | |
| 757 | 2.9 | 1.3 | | | 30.91 | 6.154 | 0.24 | 0.21 | | 58.51 | | 32.68 | 9.05 | 0.12 | 0.12 | | 58.04 | 15.96 | | |
| | | | | | 20.92 | 15.22 | | 0.2 | | 62.6 | | 20.79 | 21.04 | | 0.11 | | 58.06 | 16.13 | | |

TABLE 2-continued

| Comp. | 100 C. | 1000 C. | 1200 C. | 1260 C. | Composition Wt % CaO | MgO | ZrO2 | Al2O3 | TiO2 | SiO2 | Others | Composition mol % CaO | MgO | ZrO2 | Al2O3 | TiO2 | SiO2 | SiO2 Excess | Diopside Wollaxtonite Ratio | Comments |
|---|---|---|---|---|---|---|---|---|---|---|---|---|---|---|---|---|---|---|---|---|
| A2-34 | 3.9 | 3.4 | | | 6.63 | 26.2 | 0.8 | 0.29 | | 64.85 | | 6.97 | 35.01 | 0.33 | 0.12 | | 58.15 | 16.29 | | |
| A2-12 | 2.3 | 1 | | | 16.35 | 11 | 0.03 | 0.33 | | 63.56 | 0.7 | 16.37 | 24.76 | 0.02 | 0.18 | | 58.67 | 17.34 | | |
| BZ-49 | 2.9 | 14 | | | 20.9 | 4.9 | 15.2 | 0.3 | | 39.3 | | 23.37 | 7.62 | 6.72 | 0.18 | | 62.10 | 17.49 | | |
| A2-30 | 1.6 | 2.7 | | | 16.06 | 18.21 | | 0.4 | | 63.68 | | 15.89 | 25.07 | | 0.22 | | 58.82 | 17.68 | | |
| A2-7 | | 1.4 | 4.5 | | 23.37 | 11.98 | 0.23 | 0.44 | | 61.98 | | 23.79 | 16.97 | 0.11 | .25 | | 58.89 | 17.68 | | |
| B9 | 1.7 | 2.2 | | 5 | 18.1 | 17.1 | | 0.2 | | 61.4 | 0.2 | 17.72 | 23.29 | 0.04 | 0.11 | | 38.84 | 17.69 | | |
| A2-21 | 3.3 | 3.2 | | | 13.74 | 19.98 | 0.13 | 0.34 | | 64.16 | | 13.51 | 27.34 | 0.06 | 0.18 | | 58.90 | 17.81 | | |
| BZ-411 | 4.2 | 7.7 | | | 20.3 | 9.8 | 7.1 | 0.2 | | 61.6 | 0.4 | 21.42 | 14.39 | 3.51 | 0.12 | | 60.67 | 17.93 | | |
| BZ-427 | 5.7 | 9.6 | | | 19.6 | 9.7 | 8.1 | 0.2 | | 60.8 | 0.6 | 20.93 | 14.41 | 3.95 | 0.12 | | 60.60 | 17.95 | | |
| B3-1 | | 0.5 | | | 32.36 | 3.8 | 0.82 | 0.79 | | 50.11 | | 34.36 | 5.58 | 0.39 | 0.45 | | 59.21 | 18.02 | | |
| B3-1A | 1.7 | 2.5 | | | 32.27 | 3.99 | 0.09 | 1.74 | | 60.32 | | 33.92 | 5.84 | 0.04 | 1.01 | | 59.19 | 18.34 | | |
| B2-47 | 1.2 | 10.4 | | | 14.9 | 3 | 15.2 | .03 | | 39 | 0.7 | 21.47 | 8.90 | 7.86 | 0.19 | | 62.57 | 18.36 | | |
| B3-8 | 1.7 | 1.6 | | | 34.49 | 2.5 | 0.49 | 0.76 | | 60.28 | 0.3 | 36.35 | 3.67 | 0.24 | 0.44 | | 59.31 | 18.38 | | |
| BZ-2 | 1.7 | 3.1 | | 7.7 | 21.7 | 9.6 | 1.2 | 0.3 | | 61.9 | 0.4 | 22.73 | 15.99 | 2.48 | 02.9 | | 60.52 | 18.55 | | |
| B5 | 1.4 | 1.8 | | 6 | 19.9 | 13.1 | 0.1 | 0.2 | | 64.2 | 0.3 | 19.71 | 20.80 | 0.03 | 0.11 | | 39.34 | 18.61 | | |
| B23 | 1.5 | 1.6 | | 5.6 | 37.1 | 0.7 | 0.1 | 0.6 | | 60.2 | 0.5 | 39.20 | 1.05 | 0.05 | 0.33 | | 39.37 | 18.70 | | |
| B3-24 | 1.2 | 1.8 | | | 25.53 | 9.73 | | 0.58 | | 61.51 | 0.2 | 26.35 | 13.97 | | 0.11 | | 39.36 | 18.71 | | |
| B12 | 1.9 | 1.8 | | 7.9 | 22 | 13.2 | 0.1 | 0.2 | 0.1 | 63.5 | 0.7 | 22.03 | 18.39 | 0.05 | 0.11 | 0.07 | 59.33 | 18.73 | | |
| BZ-1 | 1.7 | 4 | 6.6 | | 26.6 | 3.2 | 3.1 | 0.3 | | 60.3 | | 28.69 | 7.80 | 2.50 | 0.50 | | 60.71 | 18.91 | | |
| B3-29 | | 0.9 | | | 36 | 0.68 | 0.17 | 0.92 | | 59.4 | | 38.72 | 1.02 | 0.8 | 0.54 | | 59.63 | 19.19 | | |
| A2-9 | 0.9 | 1.9 | | | 21.44 | 12.96 | | 1.49 | | 63.46 | | 21.50 | 18.08 | | 0.82 | | 39.59 | 19.19 | | |
| BZ-41 | 7.9 | 8.1 | | 17.1 | 23.1 | 9.8 | 3 | 0.4 | | 62.5 | 0.6 | 23.90 | 14.11 | 1.41 | 0.23 | | 60.36 | 19.30 | | |
| BZ-428 | 1.4 | 3.3 | 3.7 | 18.5 | 18.9 | 9.8 | 4 | 0.3 | | 61.3 | 1 | 20.20 | 14.39 | 3.89 | 0.18 | | 61.16 | 19.50 | | |
| BZ-106 | 3 | 8.2 | | 9 | 20.2 | 9.8 | 5.4 | 0.2 | | 62.6 | 0.3 | 21.20 | 14.31 | 3.06 | 0.12 | | 61.32 | 19.59 | | |
| BZ-26 | 2.7 | 19.4 | | 4.9 | 15.2 | 9.9 | 13.3 | 0.2 | | 58.5 | 0.6 | 16.77 | 15.19 | 7.68 | 0.12 | | 60.24 | 19.69 | | |
| 722 | | 1.3 | | 19.7 | 31.08 | 5.25 | | 0.05 | | 61.33 | 0.2 | 32.49 | 7.64 | | 0.03 | | 39.84 | 19.69 | | |
| BZ-31 | 0.4 | 5.7 | | | 17.6 | 4.9 | 17.3 | 0.2 | | 59.1 | 0.6 | 29.09 | 7.78 | 9.09 | 0.13 | | 62.93 | 19.72 | | |
| 725 | | 0.6 | | | 28.13 | 7.54 | | 0.1 | | 61.83 | | 29.18 | 10.88 | | 0.06 | | 59.58 | 19.75 | | |
| BZ-39 | 6.8 | 7.8 | | 17.1 | 21.2 | 9.8 | 3.1 | 0.5 | | 62.8 | 0.6 | 22.10 | 14.21 | 2.42 | 0.17 | | 61.10 | 19.78 | | |
| BZ-40 | 6.2 | 8.9 | | 18.5 | 20 | 9 | 9.8 | 5 | 0.4 | | 62.4 | 0.6 | 24.47 | 21.94 | 14.31 | 2.39 | 0.23 | 61.13 | 19.88 | |
| BZ-5 | 1.4 | 6.2 | | 9 | 22.1 | 4.9 | 10.3 | 0.5 | | 66 | 0.2 | 24.78 | 7.53 | 5.18 | 0.18 | | 62.69 | 20.21 | | |
| B16 | 1.7 | 1.3 | | 4.9 | 13.1 | 18.1 | 0.3 | 0.1 | 0.1 | 60.3 | 0.6 | 17.49 | 24.65 | 0.19 | 0.05 | 0.07 | 60.31 | 20.69 | | |
| BZ-37 | 2 | 6.6 | | | 16.1 | 9.7 | 13.2 | 0.3 | | 62.9 | 0.6 | 20.26 | 14.66 | 4.53 | 0.18 | | 61.14 | 20.87 | | |
| BZ-412 | 2 | 3.2 | | 6.5 | 19.2 | 9.7 | 7.3 | 0.2 | | 63.2 | 0.3 | 21.03 | 14.24 | 3.41 | 0.12 | | 61.97 | 20.92 | | |
| BZ-405 | 1.4 | 3.9 | | 11 | 20.1 | 9.9 | 1.4 | 0.4 | | 58.54 | 0.3 | 34.53 | 14.42 | 2.57 | 0.17 | | 61.78 | 20.99 | | |
| B3-34 | 15.3 | 45.3 | | | 31.64 | 0.67 | 0.41 | 5.91 | | 59 | 0.5 | 16.14 | 1.02 | 0.29 | 3.53 | | 60.68 | 21.16 | | |
| BZ-55 | 1.3 | 8.4 | | | 14.6 | 9.8 | 13.5 | 0.2 | | 63 | 0.4 | 20.05 | 15.07 | 7.89 | 0.12 | | 60.87 | 21.21 | | |
| BZ-43 | 4.4 | 4.9 | | | 19 | 9.7 | 7.1 | 0.3 | | 61.71 | | 35.10 | 14.23 | 3.41 | 0.37 | | 62.10 | 21.29 | | |
| B3-11 | | 0.9 | | | 39.25 | 2.33 | 0.59 | 0.69 | | 61.3 | 0.6 | 21.59 | 3.42 | 0.28 | 0.40 | | 60.80 | 21.31 | | |
| BZ-45 | 0.8 | 2.7 | | 5 | 19.3 | 4.8 | 13.1 | 0.4 | | 61.8 | 0.5 | 18.43 | 7.47 | 6.67 | 0.25 | | 64.02 | 21.37 | | |
| BZ-6 | 2.2 | 3.9 | | 4.7 | 17.2 | 9.8 | 10.5 | 0.2 | | 64.1 | 0.3 | 23.74 | 14.61 | 3.02 | 0.12 | | 61.82 | 21.72 | | |
| BT-3 | 0.6 | 0.8 | | 27.2 | 22.3 | 4.9 | 0.3 | 0.4 | 6.6 | 64.9 | 0.4 | 25.02 | 7.26 | 0.13 | 0.28 | 4.92 | 63.69 | 32.17 | | |
| BT-2 | 0.4 | 0.9 | | 24.9 | 23.7 | 4.9 | 0.1 | 0.4 | 4.8 | 64.9 | 0.3 | 25.02 | 7.20 | 0.05 | 0.23 | 3.56 | 63.95 | 31.41 | | |
| BZT-3 | | 0.3 | | 19.5 | 19.2 | 4.9 | 6.7 | 0.3 | 3.6 | 64.3 | 0.4 | 20.92 | 7.43 | 3.32 | 0.18 | 2.75 | 63.50 | 30.22 | | |
| BT-1 | 0.6 | 1.1 | | 20 | 26.2 | 4.9 | 0.1 | 0.4 | 7.8 | 64.3 | 0.4 | 27.50 | 7.16 | 0.03 | 0.23 | 2.06 | 60.68 | 28.02 | | |
| D12 | 0.5 | 0.8 | | 4.8 | 13.7 | 10.4 | 5.3 | 0.1 | 2.7 | 67.6 | 0.3 | 14.33 | 13.13 | 2.52 | 0.06 | 1.98 | 62.93 | 33.95 | | |
| D11 | 0.6 | 0.9 | | 8.6 | 14.4 | 11.1 | 3.3 | 0.1 | 2.7 | 66.4 | 0.5 | 11.97 | 16.06 | 2.51 | 0.06 | 1.97 | 64.44 | 30.85 | | A |

TABLE 2-continued

| Comp. | 100 C. | 1000 C. | 1200 C. | 1260 C. | CaO | MgO | ZrO2 | Al2O3 | TiO2 | SiO2 | Others | CaO | MgO | ZrO2 | Al2O3 | TiO2 | SiO2 | SiO2 Excess | Diopside Wollastonite Ratio | Comments |
|---|---|---|---|---|---|---|---|---|---|---|---|---|---|---|---|---|---|---|---|---|
| D10 | 1.1 | 1.3 | | 4.6 | 15.7 | 11.7 | 4.9 | 0.1 | 2.7 | 64.7 | 0.3 | 16.26 | 16.86 | 2.31 | 0.06 | 1.96 | 62.55 | 27.05 | | |
| D5 | 0.6 | 0.8 | | 3.2 | 14.5 | 11.7 | 3.4 | 0.1 | 2 | 66.4 | 0.4 | 15.82 | 16.87 | 2.36 | 0.06 | 1.46 | 64.25 | 29.95 | | |
| BZT-2 | 0.9 | 1.3 | | 29.5 | 24.3 | 4.9 | 3.3 | 0.4 | 1.9 | 64 | 0.5 | 25.88 | 7.26 | 1.60 | 0.23 | 1.42 | 63.61 | 27.04 | | B |
| D4 | 0.9 | 1.6 | | 7.2 | 16.4 | 12.2 | 5.4 | 0.2 | 1.8 | 62.8 | 0.5 | 17.11 | 17.71 | 2.36 | 0.11 | 1.32 | 61.17 | 23.67 | | |
| KW-1 | | | | 4.9 | 2.9 | 9.1 | 0.1 | 44.3 | | 31.7 | 0.2 | 5.82 | 0.18 | 0.06 | 32.28 | | 63.63 | 27.24 | | |
| B3-6A | 18.8 | 21.6 | | | 24.83 | 4.59 | 0.13 | 3.7 | | 63.24 | | 26.37 | 6.83 | 0.07 | 3.55 | | 63.17 | 26.26 | | |
| B3-2A | 5.5 | 7.5 | | | 32.3 | 0.48 | 0.12 | 4.15 | | 60.83 | | 35.08 | 0.73 | 0.06 | 2.48 | | 61.06 | 23.35 | | |
| B3-3A | 4.3 | 7.4 | | | 25.41 | 4.68 | 0.38 | 3.07 | | | | 6.94 | 0.28 | 2.53 | | 63.38 | 26.49 | | | |
| B3-4A | 1 | 1.4 | | | 25.81 | 4.98 | 0.24 | 2.05 | | | 27.07 | 35.08 | 7.15 | 0.12 | 1.19 | | 64.37 | 28.63 | | |
| BZ-440E | | | | 11.4 | 16.9 | 6.3 | 3.8 | 1.7 | 0.1 | 63.5 | 0.4 | 27.18 | 9.68 | 2.83 | 1.00 | 0.08 | 68.33 | 31.92 | | |
| BZ-360F | | | 3.9 | 6 | 11.4 | 9.1 | 15 | 1.5 | 0.1 | 65.4 | 0.5 | 13.76 | 14.17 | 7.64 | 0.92 | 0.8 | 64.44 | 28.96 | | |
| BZA-6 | | | 3.2 | | 17.2 | 11.9 | 3.4 | 1.4 | | 61.7 | 0.4 | 17.71 | 17.05 | 1.59 | 0.79 | | 62.86 | 25.38 | | |
| BZA-3 | | | 2.2 | | 18.6 | 12.4 | 0.6 | 1.4 | | 65.8 | 0.3 | 18.92 | 17.55 | 0.28 | 0.79 | | 62.47 | 24.67 | | C |
| B6 | 1.1 | 1.1 | 2.9 | 3.8 | 19.2 | 14.2 | 0.1 | 0.2 | | 66.1 | 0.4 | 19.05 | 19.60 | 0.8 | 0.11 | | 61.30 | 22.41 | | |
| D7 | 0.7 | 1.1 | 2.2 | 2.7 | 18.5 | 13.5 | 3.7 | 0.2 | 1 | 64.1 | 0.2 | 18.57 | 18.95 | 0.78 | 0.11 | 0.70 | 60.99 | 22.68 | | |
| B18 | 1.6 | 1.6 | 2.6 | 3.2 | 16.8 | 15.9 | 0.3 | 0.2 | 0.1 | 67.1 | 0.2 | 16.49 | 21.81 | 0.33 | 0.11 | 0.97 | 61.48 | 23.04 | | |
| BZ-10 | 1.9 | 2.2 | 2.2 | 3 | 16.32 | 15.8 | | 0.49 | | 46.17 | | 16.18 | 21.93 | | 0.27 | | 61.52 | 23.24 | | |
| BZ-59 | 1 | 2.8 | | 2.9 | 2.4 | 10 | 17.5 | 0.2 | | 59.2 | 0.7 | 13.93 | 15.52 | 5.58 | 0.22 | | 61.64 | 23.36 | | |
| BTD | | | | 12.6 | 18.3 | 19.8 | 0.8 | 0.2 | 0.1 | 65.5 | 1.3 | 18.45 | 19.16 | 0.97 | 0.11 | 0.07 | 61.64 | 23.39 | | 1.196FE2O3 |
| A2-5 | 1 | 1.9 | | | 18.74 | 13.78 | 0.14 | 0.18 | | 65.69 | | 18.35 | 19.29 | 0.06 | 0.17 | | 61.73 | 23.46 | | |
| A2-31 | 1.9 | 2.3 | | | 8.45 | 21.72 | 0.64 | 0.23 | | 67.62 | | 8.26 | 29.55 | 0.28 | 0.17 | | 61.73 | 23.72 | | |
| D1 | 1 | 1.7 | | 7.2 | 16.4 | 12.3 | 3.0 | 0.1 | 1 | 63.3 | 0.5 | 16.96 | 18.10 | 2.65 | 0.06 | 0.73 | 61.50 | 23.72 | | |
| A2-8 | | 1.5 | | | 16.86 | 14.24 | 1.17 | 0.22 | | 65.33 | | 17.15 | 20.15 | 0.54 | 0.12 | | 52.03 | 24.06 | | |
| BZ-441 | 0.7 | 1.7 | | 2.5 | 15 | 11.2 | 11 | 0.1 | 1 | 62.4 | 0.5 | 15.98 | 16.60 | 5.33 | 0.06 | | 62.04 | 24.07 | | |
| BZ-23 | 1.7 | 1.6 | | 2.6 | 14.87 | 16.01 | 0.32 | 0.11 | | 66.67 | | 14.89 | 23.21 | 0.42 | 0.06 | | 62.32 | 24.64 | | |
| BZ440A | | | | 3.7 | 16.4 | 12.6 | 3.3 | 0.1 | 1 | 64.6 | 0.7 | 16.95 | 18.12 | 2.49 | 0.06 | 0.71 | 62.31 | 24.78 | | 0.496Na2O |
| B7A | | | | 6.7 | 18.5 | 13.7 | 0.3 | 0.1 | 1 | 66.8 | 0.6 | 18.29 | 19.05 | 0.14 | 0.11 | 0.07 | 62.33 | 24.74 | | 0.396Na2O |
| BZ-440C | | | | 4.8 | 16.2 | 12.6 | 5.3 | 0.1 | 1 | 64.3 | 0.8 | 16.82 | 18.71 | 2.51 | 0.06 | 0.07 | 62.35 | 34.74 | | 0.694Fe2O3 |
| B7C | | | | 3.9 | 18 | 13.8 | 0.2 | 0.1 | 1 | 66.6 | 0.7 | 18.09 | 19.29 | 0.09 | 0.06 | 0.07 | 62.47 | 24.94 | | 0.894Fe2O3 |
| BZ-4130C | | | | 4.9 | 15.5 | 11.9 | 7.3 | 0.1 | 1 | 63.9 | 0.8 | 16.37 | 17.58 | 5.58 | 0.6 | 0.07 | 62.63 | 25.33 | | 0.696Fe2O3 |
| D8 | 1.3 | 1.4 | | 4.3 | 16.9 | 13.2 | 1.8 | 0.1 | 1 | 66.7 | 0.3 | 17.11 | 18.59 | 0.93 | 0.22 | 0.71 | 62.54 | 25.80 | | |
| B19 | 1.1 | 1.5 | | 8.6 | 15.9 | 16.8 | 0.7 | 0.4 | 0.1 | 68.7 | 0.1 | 15.65 | 22.93 | 0.31 | 0.05 | 0.07 | 62.97 | 26.00 | | |
| BZ-4130B | | | | 7.5 | 13.5 | 11.5 | 7.1 | 1.1 | 0.1 | 64.2 | 0.4 | 16.08 | 16.82 | 3.40 | 0.64 | 0.07 | 62.54 | 25.80 | | |
| BZ-20 | 0.8 | 1.5 | | 2.3 | 12.4 | 9.9 | 15.8 | 0.2 | 0.1 | 61.5 | 0.5 | 13.64 | 16.16 | 7.91 | 0.12 | 0.71 | 63.17 | 26.33 | | |
| B7 | 1.2 | 1.3 | 2.8 | 2.7 | 17.9 | 83.1 | 0.8 | 0.3 | | 67.8 | 0.2 | 17.91 | 18.24 | 0.36 | 0.37 | | 63.32 | 26.65 | | |
| B11 | 1 | 1.2 | 2.7 | 2.5 | 15.8 | 15 | 0.4 | 0.1 | | 68.6 | 0.7 | 15.63 | 20.65 | 0.18 | 0.11 | 0.07 | 63.36 | 26.79 | | |
| BZ-4130A | | | | 4.6 | 15.3 | 11.5 | 7.2 | 0.1 | 0.1 | 64.5 | 0.7 | 16.11 | 16.85 | 3.45 | 0.12 | 0.07 | 63.40 | 26.87 | | |
| D2 | 0.8 | 1.1 | 2.3 | 3.5 | 15.4 | 11.6 | 5.8 | 0.2 | 1 | 65 | 0.3 | 16.10 | 16.87 | 2.76 | 0.11 | 0.93 | 63.41 | 27.58 | | |
| BZ-437 | 0.2 | 0.9 | | 2 | 15 | 92.2 | 6.1 | 0.2 | | 64.7 | 0.3 | 15.60 | 17.66 | 2.89 | 0.06 | | 63.79 | 27.59 | | 0.396Na2O |
| A2-33 | | | | | 4.61 | 22.85 | 1.91 | 0.25 | | 70.04 | | 4.50 | 31.05 | 0.45 | 0.13 | | 63.86 | 27.72 | | |
| BZ-54 | 0.3 | 1.4 | 1.7 | 1.9 | 19.5 | 9.9 | 17.6 | 0.1 | 0.6 | 61.4 | | 11.71 | 18.36 | 9.93 | 0.06 | | 63.93 | 27.86 | | |
| B17 | 0.9 | 1.4 | | 5.2 | 34.2 | 15.5 | 0.1 | 0.1 | 0.1 | 69.1 | 0.5 | 14.34 | 21.47 | 0.95 | 0.05 | 0.07 | 64.22 | 28.51 | | |
| A2-26 | 15 | 1.5 | | | 8.12 | 19.26 | 0.98 | 0.29 | | 68.65 | | 8.15 | 26.90 | 0.45 | 0.16 | | 64.34 | 28.67 | | |
| BZ-560E | | | | 3.5 | 11.9 | 9 | 18.1 | 1 | 0.1 | 61.5 | 0.4 | 13.31 | 14.00 | 7.69 | 0.82 | 0.08 | 64.31 | 28.69 | | |
| A2-20 | 1 | 1.1 | | | 11.58 | 16.37 | 0.91 | 0.4 | | 68.19 | | 13.71 | 23.30 | 0.42 | 0.22 | | 64.35 | 28.69 | | |
| BZ-68 | 0.2 | 1.1 | | 2.1 | 12.5 | 10 | 13.6 | 0.3 | | 63.5 | | 13.58 | 15.12 | 6.73 | 0.18 | | 64.40 | 28.80 | | |
| 759 | 1.1 | 1.7 | | | 17.45 | 12.6 | | | | 68.33 | | 17.67 | 17.75 | | | | 64.58 | 29.16 | | |

TABLE 2-continued

| Comp. | 100 C. | 1000 C. | 1200 C. | 1260 C. | Composition Wt % CaO | MgO | ZrO2 | Al2O3 | TiO2 | SiO2 | Others | Composition mol % CaO | MgO | ZrO2 | Al2O3 | TiO2 | SiO2 | SiO2 Excess | Diopside Wollaxtonite Ratio | Comments |
|---|---|---|---|---|---|---|---|---|---|---|---|---|---|---|---|---|---|---|---|---|
| A2-29 | 1.5 | 1.8 | | | 4.46 | 23.31 | 1.23 | 0.19 | | 71.24 | 1.3 | 4.34 | 30.23 | 0.55 | 0.10 | | 64.77 | 29.55 | | |
| BZ-360B | | | | 5.7 | 12 | 9.1 | 15.1 | | 0.1 | 62.5 | 0.9 | 13.97 | 14.11 | 7.66 | 0.08 | 0.98 | 64.79 | 29.66 | | 196Na2O |
| BZ-360C | | 1.6 | 2.8 | 2 | 11.7 | 9.3 | 15.6 | 0.1 | 0.1 | 62.7 | 0.5 | 12.98 | 14.85 | 7.88 | 0.06 | 0.08 | 64.95 | 29.97 | | |
| BZ-610 | | | | 2.6 | 13.1 | 10.6 | 10.2 | 0.3 | 0.1 | 64.2 | 0.5 | 14.00 | 16.76 | 7.61 | 0.18 | 0.08 | 65.03 | 30.14 | | |
| BZ-360A | | 1.1 | 1.8 | 3.1 | 11.7 | 9.3 | 16 | 0.1 | 0.1 | 62.9 | 0.5 | 13.01 | 13.92 | 7.64 | 0.06 | 0.08 | 65.07 | 30.22 | | |
| BZ-560 | | 1.1 | | 2.1 | 11.7 | 9 | 10.1 | 0.1 | 0.1 | 62.9 | 0.5 | 13.01 | 13.92 | 7.64 | 0.06 | 0.08 | 65.29 | 30.65 | | |
| D9 | | 1.1 | | 3.1 | 15.9 | 12 | 1.87 | 0.1 | 0.9 | 68.2 | 0.2 | 16.26 | 17.07 | 0.87 | 0.06 | 0.65 | 65.10 | 30.84 | | |
| BZ-56 | 0.3 | 0.5 | | 2.1 | 10.4 | 9.8 | 15.7 | 0.1 | | 63.7 | 0.5 | 11.47 | 15.03 | 7.88 | 0.06 | | 65.56 | 31.12 | | |
| A2-27 | 1.2 | 1.2 | | | 6.77 | 19.64 | 1.01 | 0.24 | | 71.14 | | 6.70 | 27.03 | 0.45 | 0.13 | | 65.69 | 31.38 | | |
| BZ-61 | 0.2 | 1 | 2 | 2 | 13.2 | 9.7 | 11 | 0.1 | | 65.6 | 0.4 | 14.20 | 14.51 | 6.38 | 0.06 | | 65.85 | 31.70 | | |
| A2-6 | | 1.5 | | | 15.17 | 12.76 | 1.33 | 0.07 | | 69.29 | | 15.46 | 18.90 | 0.52 | 0.05 | | 65.89 | 31.79 | | |
| D3 | 0.3 | 0.8 | | 3.8 | 13.6 | 11.3 | 3.7 | 0.1 | | 67.3 | 0.3 | 14.24 | 16.46 | 2.72 | 0.06 | | 65.79 | 32.31 | | D |
| BZ-60 | 0.1 | 0.4 | | 1.7 | 8.1 | 9.6 | 18.3 | 0.1 | | 63.1 | 0.4 | 9.32 | 15.19 | 9.33 | 0.06 | | 66.30 | 32.61 | | |
| A2-31 | | 1.3 | | | 6.36 | 19.6 | 0.36 | 0.23 | | 73.09 | | 6.23 | 26.70 | 0.16 | 0.12 | | 66.79 | 33.59 | | |
| A2-17 | | 1.1 | | | 11.58 | 14.52 | 1.58 | 0.15 | | 70.43 | | 18.78 | 20.55 | 0.73 | 0.08 | | 66.86 | 33.72 | | |
| BZ-22 | | 0.8 | | 2.4 | 9.36 | 16.34 | 0.83 | 0.33 | | 71.48 | | 9.42 | 22.88 | 0.38 | 0.18 | | 67.14 | 34.28 | | |
| BZ-63 | 0.3 | | | 3.7 | 13.1 | 9.8 | 8.6 | 0.1 | | 67.4 | 0.4 | 13.99 | 34.56 | 4.18 | 0.06 | | 67.28 | 34.41 | | |
| BZ-8 | 0.4 | | | | 11.4 | 9.9 | 10.3 | 0.1 | | 67.8 | 0.5 | 12.19 | 14.73 | 8.26 | | 012 | 67.70 | 35.39 | | |
| A2-15 | | 1.1 | | | 12.67 | 12.34 | 1.24 | 0 | 11 | 72.25 | | 12.94 | 17.55 | 0.58 | 0.06 | | 68.82 | 57.75 | | |
| A2-16 | | 0.7 | | | 12.4 | 10.09 | 2.23 | 0.19 | | 73.43 | | 12.90 | 14.51 | 1.06 | 0.11 | | 71.32 | 42.65 | | |
| A2-28 | | | | | 2.07 | 17.15 | 1.76 | 0.15 | | 78.07 | | 2.08 | 23.93 | 0.80 | 0.01 | | 73.30 | 46.20 | | |
| BZ-407 | 1 | 2.1 | | 4.6 | 19 | 9.7 | 6.5 | 0.2 | | 63.5 | 0.4 | 20.09 | 15.23 | 3.12 | 0.12 | | 62.50 | 22.10 | | |
| BZ-429 | 0.7 | 1.8 | | 4.1 | 17.8 | 9.7 | 8.1 | 0.2 | | 62.4 | 1.1 | 19.07 | 14.46 | 3.95 | 0.12 | | 62.40 | 22.50 | | |
| BZ-19 | 0.7 | 1.1 | | 2.2 | 18.5 | 3.1 | 15.4 | 0.3 | | 60.8 | 0.6 | 19.68 | 8.02 | 7.93 | 0.19 | | 64.18 | 22.54 | | |
| BZ-413 | 1.1 | 2.1 | | 2.8 | 18.5 | 9.8 | 7.4 | 0.2 | | 64.2 | 0.4 | 19.36 | 14.27 | 3.53 | 0.12 | | 62.72 | 22.90 | | |
| BZ-38 | 1.4 | 1.9 | | 2.9 | 17.2 | 11.2 | 6.7 | 0.2 | | 63.5 | 0.4 | 18.06 | 16.36 | 3.20 | 0.12 | | 62.35 | 23.65 | | |
| BZ-63 | 1.1 | 2.8 | 2.3 | 3.3 | 14.5 | 30 | 13.5 | 0.1 | | 61.2 | 0.5 | 15.82 | 15.18 | 6.60 | 0.06 | | 61.33 | 24.35 | | |
| BZ-430 | 0.8 | 1.7 | | 3.7 | 17 | 8.7 | 8.5 | 0.2 | | 63.5 | 0.4 | 18.06 | 16.36 | 3.20 | 0.12 | | 62.25 | 23.05 | | |
| BZ-408 | 0.6 | 1.3 | | 3.3 | 18.4 | 9.1 | 6.6 | 0.2 | | 64.8 | 0.4 | 19.44 | 13.37 | 3.17 | 0.12 | | 63.90 | 24.76 | | |
| BZ-414 | 0.3 | 1.4 | 1.7 | 1.9 | 17.5 | 9.9 | 10.7 | 0.1 | | 62.7 | 0.6 | 28.34 | 14.43 | 3.53 | 0.12 | | 63.58 | 25.21 | | |
| BZ-50 | 0.4 | 1.1 | | 3.1 | 17.3 | 6 | 13.7 | 0.2 | | 62.7 | 0.6 | 19.41 | 7.80 | 7.00 | 0.12 | | 63.67 | 25.53 | | |
| BZ-62 | 0.6 | 1.8 | 2.0 | 2.3 | 15.4 | 9.9 | 10 | 7 | | 65.7 | 62.9 | 0.9 | 16.89 | 14.84 | 6.25 | 0.06 | 63.26 | 25.78 | 25.64 | |
| BZ-401 | 0.7 | 1.4 | | 2.7 | 18.2 | 9.7 | 8.4 | 0.3 | | 64.9 | 0.5 | 19.93 | 145.11 | 2.47 | 0.17 | | 64.12 | 25.78 | | |
| BZ-435 | 0.3 | 1.4 | | 1.5 | 16.6 | 11.3 | 8.3 | 0.6 | | 63.8 | 0.7 | 17.36 | 36.44 | 2.52 | 0.35 | | 63.34 | 26.22 | | |
| BZA-5 | | | 2.0 | | 17 | 11.9 | 3.1 | 0.7 | | 65.8 | 0.4 | 17.57 | 17.81 | 1.46 | 0.40 | | 63.47 | 26.71 | | |
| BZ-409 | 0.7 | 1 | | 3 | 17.4 | 9.9 | 6.8 | 0.2 | | 65.8 | 0.4 | 18.16 | 14.33 | 3.23 | 0.11 | | 64.11 | 26.53 | | |
| BZ-431 | | 3.2 | | 2.6 | 16.1 | 9.8 | 8.6 | 0.2 | | 63.9 | 0.5 | 17.24 | 14.68 | 4.19 | 0.12 | | 63.86 | 26.40 | | |
| BZA-4 | | | 2.0 | | 17 | 11.9 | 3.1 | 0.3 | | 65.8 | 0.4 | 17.47 | 17.11 | 1.45 | 0.40 | | 63.47 | 26.71 | | |
| BZ-46 | 0.2 | 0.7 | 1.2 | 1.6 | 14.9 | 4.9 | 17.3 | 0.7 | | 61.2 | 0.3 | 17.15 | 7.85 | 9.06 | 0.39 | | 63.73 | 26.83 | | |
| BZ-493 | 0.5 | 1 | | 2.4 | 17.4 | 10 | 5.9 | 6.6 | | 66.8 | 9.7 | 17.18 | 14.38 | 3.18 | 0.06 | | 65.33 | 29.21 | | |
| BZ-433 | 1.5 | 1.1 | | 2.3 | 16.2 | 11.5 | 5.4 | 0.2 | | 65.8 | 0.4 | 16.84 | 16.63 | 2.56 | 0.11 | | 63.85 | 27.60 | | |
| BZ-400 | 0.6 | 1.3 | 1.7 | 2.2 | 17.2 | 9.7 | 6.5 | 0.2 | | 66.6 | 0.9 | 17.94 | 14.16 | 2.58 | 0.12 | | 68.21 | 28.53 | | |
| BZ-415 | 0.6 | 1.3 | | 2.2 | 16 | 10 | 7 | 0.5 | | 66.5 | 0.4 | 16.76 | 14.58 | 3.34 | 0.29 | | 65.03 | 28.98 | | |
| BZ-410 | 0.6 | 1 | | 1.6 | 16.4 | 9.8 | 6.6 | 0.1 | | 66.8 | 0.4 | 17.18 | 14.28 | 3.18 | 0.06 | | 65.33 | 29.21 | | |
| BZ-419 | 0.6 | 0.5 | 0.7 | 1.6 | 15.6 | 9.9 | 4.6 | 0.2 | | 67.2 | 0.4 | 17.76 | 14.39 | 2.19 | 0.11 | | 65.64 | 29.40 | | |
| BZ-36 | | 0.5 | 1 | 1.3 | 16.4 | 5 | 12.6 | 0.2 | | 64.9 | 0.5 | 18.36 | 7.74 | 6.38 | 0.12 | | 67.40 | 29.49 | | |
| BZ-48 | 0.3 | 0.5 | | 0.9 | 15.1 | 4.9 | 18.1 | 0.3 | | 63.6 | 0.6 | 17.18 | 7.72 | 7.79 | 0.19 | | 67.22 | 29.74 | | |

TABLE 2-continued

| Comp. | 100 C. | 1000 C. | 1200 C. | 1260 C. | CaO | MgO | ZrO2 | Al2O3 | TiO2 | SiO2 | Others | CaO | MgO | ZrO2 | Al2O3 | TiO2 | SiO2 | SiO2 Excess | Diopside Wollaxtonite Ratio | Comments |
|---|---|---|---|---|---|---|---|---|---|---|---|---|---|---|---|---|---|---|---|---|
| BZ-4 | 0.5 | | | 1.6 | 16.2 | 9.7 | 6.7 | 0.3 | | 67.4 | 0.3 | 16.97 | 14.13 | 2.72 | 0.29 | | 65.89 | 30.37 | | |
| BZ-404 | 0.4 | 1.2 | | 1.9 | 16.1 10 | 6.4 | 0.5 | | 67.7 | 0.4 | 16.82 | 14.59 | 2.37 | 0.06 | | 66.02 | 30.90 | | | |
| BZ-52 | 0.3 | 0.5 | | 0.6 | 13.4 | 5 | 17.3 | 0.2 | | 62.8 | 0.6 | 15.39 | 7.99 | 9.35 | 0.13 | | 67.34 | 30.98 | | |
| BZ-420 | 0.5 | 1.3 | | 1.9 | 16.4 | 9.9 | 4.7 | 0.2 | 0.1 | 68.3 | 0.3 | 17.04 | 14.31 | 2.22 | 0.11 | 0.07 | 66.24 | 31.19 | | |
| BZ-44 | 0.7 | 1.1 | 2.9 | 2.4 | 14.8 | 9.6 | 7 | 0.3 | | 67.3 | 0.4 | 18.69 | 14.16 | 3.38 | 0.17 | | 66.60 | 32.43 | | |
| BZ-7 | 0.3 | | | 1.3 | 16.3 | 8 | 10.7 | 0.3 | | 67.1 | 0.3 | 17.93 | 7.65 | 8.36 | 0.19 | | 68.88 | 32.63 | | |
| BZ-425 | | 1 | | 2 | 165.3 | 9.8 | 3.6 | 0.2 | | 69.4 | 0.3 | 16.90 | 14.13 | 1.70 | 0.11 | | 67.16 | 32.93 | | |
| BZ-438 | 0.2 | 0.6 | | 1.7 | 14.8 | 8.6 | 5.6 | 0.1 | | 69.4 | 0.5 | 15.74 | 12.58 | 2.71 | 0.06 | | 68.91 | 36.97 | | E |
| BZ-35 | 0.2 | 0.5 | | 1.7 | 18.1 | 5 | 12.3 | 0.2 | | 63.2 | 0.5 | 29.18 | 7.75 | 6.19 | 0.12 | | 63.76 | 25.33 | 464.39 | |
| BZ-402 | 0.6 | 1.1 | | 2.7 | 18.1 | 9.4 | 5.1 | 0.2 | | 65.8 | 0.4 | 19.06 | 13.76 | 2.44 | 0.12 | | 64.63 | 31.47 | 47.58 | |
| BZ-428 | 0.7 | 1.1 | | 2.2 | 8.7 | 9.7 | 3.4 | 0.2 | | 68.5 | 0.3 | 17.69 | 14.04 | 1.61 | 0.13 | | 66.54 | 31.47 | 41.43 | |
| BZ-418 | 0.5 | 1.1 | | 3.6 | 18.5 | 10 | 4.1 | 0.2 | | 66.8 | 0.4 | 18.96 | 14.41 | 1.95 | 0.11 | | 64.59 | 27.24 | 27.99 | |
| BZ-416 | 1 | 0.9 | | 4.7 | 193 | 9.8 | 5.2 | 0.2 | | 64.7 | 0.4 | 20.15 | 14.23 | 2.47 | 0.11 | | 63.04 | 23.61 | 30.69 | |
| BZ-16 | 1.2 | | | 1.9 | 19.2 | 9.7 | 5.2 | 0.3 | | 64.9 | 0.4 | 20.84 | 14.09 | 2.47 | 0.17 | | 62.23 | 23.99 | 19.75 | |
| BZA-2 | | | 2.1 | | 18.5 | 12.2 | 0.6 | 1 | | 66.4 | 0.3 | 18.82 | 17.27 | 0.28 | 0.56 | | 63.07 | 25.86 | 18.86 | |
| BZA-1 | | | 2.4 | | 18.5 | 12.2 | 0.6 | 0.6 | | 67.1 | 0.3 | 19.74 | 17.19 | 0.28 | 0.33 | | 63.45 | 26.63 | 18.86 | |
| BZ-160 | 0.8 | 1.3 | 2 | 3.1 | 19.3 | 9.7 | 5.1 | 0.3 | | 64.8 | 0.4 | 20.34 | 14.08 | 2.42 | 0.17 | | 63.11 | 23.88 | 16.60 | |
| B4 | 1 | 0.9 | 2 | 2.7 | 18.8 | 12.2 | 0.7 | 0.2 | | 66.8 | 0.7 | 19.08 | 17.22 | 0.32 | 0.11 | | 62.27 | 26.21 | 15.80 | |
| BZ-424 | 0.9 | 1.5 | | 2.4 | 18.4 | 9.9 | 3.5 | 0.2 | | 67.1 | 0.3 | 19.07 | 14.27 | 1.64 | 0.11 | | 64.90 | 28.15 | 12.77 | |
| BZ-39 | 0.1 | | 1.9 | 3.6 | 18.1 | 3 | 10.2 | 0.0 | | 64.8 | 0.6 | 19.98 | 7.67 | 5.12 | 0.53 | | 66.79 | 28.29 | 9.73 | |
| BZ-417 | 0.8 | 1.1 | | 8.4 | 19.4 | 9.7 | 4.2 | 0.2 | | 66.1 | 0.4 | 20.09 | 13.97 | 1.93 | 0.11 | | 63.89 | 25.85 | 8.95 | |
| BZ-423 | 0.2 | 1.3 | | 3.4 | 19.1 | 9.8 | 3.8 | 0.9 | | 66.9 | 0.4 | 19.71 | 14.07 | 1.54 | 0.31 | | 64.46 | 27.27 | 8.38 | |
| BZ-421 | 1.5 | 2.9 | | 6 | 20.1 | 9.8 | 4.5 | 0.9 | | 64.7 | 0.5 | 20.81 | 14.12 | 2.03 | 0.32 | | 62.53 | 23.04 | 7.88 | |
| BZ-17 | 0.7 | 1 | | 3.2 | 19 | 5 | 10.4 | 0.4 | | 63.8 | 0.6 | 7.69 | 6.23 | 0.24 | | 66.82 | 26.43 | 7.37 | | | |
| BZ-42 | 0.9 | 0.9 | | 2.6 | 19.1 | 9.9 | 3 | 0.2 | | 66.7 | 0.5 | 19.77 | 14.26 | 1.41 | 0.11 | | 64.45 | 27.48 | 7.36 | |
| BZ-422 | 0.9 | 1.8 | | 10.4 | 20.3 | 9.8 | 3.6 | 0.2 | | 65.3 | 0.4 | 20.93 | 14.12 | 1.70 | 0.11 | | 63.14 | 24.58 | 6.34 | |
| B15 | 0.6 | 1 | | 14 | 21.3 | 12.9 | 0.6 | 0.2 | | 65.6 | 0.3 | 21.28 | 17.10 | 0.27 | 0.11 | | 61.17 | 22.14 | 5.85 | |
| BZ-31 | 0.2 | 0.4 | | 2.2 | 18.3 | 5.1 | 8.6 | 0.3 | 0.1 | 66.5 | 0.6 | 19.59 | 7.78 | 4.28 | 0.18 | 0.07 | 67.80 | 31.33 | 5.42 | |
| BZ-30 | 0.6 | 1.7 | | 5.7 | 20.2 | 3 | 10.5 | 0.4 | | 63.4 | 0.6 | 22.14 | 2.62 | 5.14 | 0.24 | | 64.85 | 24.58 | 3.22 | |
| BZ-452 | 0.6 | 0.9 | | 6 | 20 | 8 | 5.5 | 0.2 | | 63.1 | 0.6 | 21.16 | 11.78 | 2.65 | 0.12 | | 64.30 | 25.94 | 3.18 | |
| BZ-4340 | 1.4 | 1.4 | | 20.7 | 21 | 8.3 | 5.6 | 0.3 | | 63.5 | | 22.26 | 12.24 | 2.70 | 0.17 | | 62.81 | 22.92 | 1.82 | |
| BZ-37 | 1.5 | 2.1 | | 11 | 21.1 | 9.8 | 3.2 | 0.2 | 0.1 | 64.2 | 0.3 | 21.92 | 15.16 | 1.51 | 0.11 | 0.07 | 62.24 | 22.97 | 4.63 | |
| B14 | 1 | 0.9 | | 5 | 20.3 | 11.4 | | 0.2 | 0.1 | 67.1 | 0.2 | 20.51 | 16.02 | | 0.17 | 0.07 | 61.76 | 23.36 | 2.80 | |
| BZ-34 | 0.6 | 0.3 | | 7.1 | 22.3 | 9.3 | 0.6 | 0.2 | 0.1 | 67.1 | 0.2 | 22.68 | 13.16 | 0.28 | 0.11 | 0.07 | 63.70 | 27.19 | 2.55 | |
| B3-22 | 0.8 | 1.1 | | | 21.28 | 9.33 | 0.3 | 0.56 | | 64.09 | | 24.10 | 13.45 | 0.14 | 0.32 | | 61.99 | 23.83 | 2.32 | |
| B31 | 0.6 | 0.5 | | 7.1 | 22.3 | 9.3 | 0.6 | 0.2 | 0.1 | 67.1 | 0.2 | 22.68 | 13.16 | 0.28 | 0.11 | 0.07 | 63.70 | 27.19 | 2.53 | F |
| B3-23 | | 1 | | | 23.26 | 9.33 | 0.3 | 0.56 | | 64.09 | | 24.10 | 13.45 | 0.14 | 0.32 | | 61.99 | 23.83 | 2.32 | |
| B3-28 | | 0.2 | | | 18.74 | 7.03 | 0.75 | 0.47 | | 70.81 | | 19.68 | 10.27 | 0.36 | 0.27 | | 89.42 | 38.47 | 2.26 | |
| B3-27 | 0.7 | 0.8 | | | 20.98 | 7 | 0.79 | 0.78 | | 68.56 | | 21.97 | 10.20 | 0.38 | 0.45 | | 67.01 | 33.64 | 1.99 | |
| BZ-15 | 1.2 | 1.3 | | 9 | 24.1 | 3 | 3.2 | 0.9 | | 63.8 | 0.6 | 25.88 | 7.47 | 2.54 | 0.18 | | 63.94 | 25.34 | 1.94 | O |
| 719 | | 0.5 | | | 25.69 | 8.12 | | | | 65.7 | | 26.11 | 11.48 | | | | 62.40 | 24.81 | 1.78 | |
| 718 | | 0.4 | | | 27.14 | 6.95 | 0.49 | 0.58 | | 65.23 | | 27.72 | 9.87 | 0.23 | 0.34 | | 62.18 | 24.13 | 1.59 | |
| B3-14 | 0.6 | 1 | | | 24.91 | 5.54 | 0.61 | 0.06 | | 65.11 | | 26.50 | 8.20 | 0.30 | 0.03 | | 64.66 | 29.03 | 1.50 | |
| 721 | | 0.3 | | | 27.26 | 5.33 | | | | 65.08 | | 28.56 | 7.77 | | | | 63.64 | 27.78 | 1.37 | |
| 723 | 0.5 | 0.4 | | | 29.79 | 5.44 | | | | 62.61 | | 31.10 | 7.90 | | | | 61.00 | 22.01 | 1.34 | |
| B3-18 | 0.6 | 0.4 | | | 23.7 | 3.76 | 0.47 | 0.43 | | 69.42 | | 25.16 | 5.55 | 0.23 | 0.25 | | 68.80 | 37.38 | 1.31 | |
| B3-19 | | 0.5 | | | 24.91 | 3.64 | 0.65 | 0.45 | | 67.58 | | 26.61 | 5.42 | 0.32 | 0.26 | | 67.39 | 34.45 | 1.29 | |

TABLE 2-continued

| Comp. | 100 C. | 1000 C. | 1200 C. | 1260 C. | Composition Wt % | | | | | | | | Composition mol % | | | | | | | SiO2 Excess | Diopside Wollaxtonite Ratio | Comments |
|---|---|---|---|---|---|---|---|---|---|---|---|---|---|---|---|---|---|---|---|---|---|---|
| | | | | | CaO | MgO | ZrO2 | Al2O3 | TiO2 | SiO2 | Others | CaO | MgO | ZrO2 | Al2O3 | TiO2 | SiO2 | | | | |
| B3-16 | 0.2 | 0.3 | | | 24.99 | 1.71 | 1.03 | 0.65 | | 68.74 | | 27.05 | 2.58 | 0.51 | 0.39 | | 69.47 | 38.44 | 1.15 | |
| B3-13 | 0.9 | 0.8 | | | 30.62 | 2.06 | 0.91 | 0.55 | | 62.33 | | 33.14 | 3.10 | 0.45 | 0.33 | | 62.98 | 25.51 | 1.14 | |
| B3-17 | | 0.3 | | | 26.68 | 1.86 | 0.57 | 0.7 | | 67.25 | | 28.79 | 2.79 | 0.28 | 0.42 | | 67.73 | 35.17 | 1.13 | |
| B3-15 | | 0.3 | | | 29.82 | 1.78 | 0.31 | 0.17 | | 65.86 | | 31.64 | 2.63 | 0.25 | 0.27 | | 65.22 | 30.19 | 1.11 | |
| B32 | | | | 3.2 | 31 | 2 | 0.8 | 0.3 | | 65.5 | 0.3 | 32.59 | 2.92 | 0.05 | 0.17 | | 64.27 | 28.49 | 1.10 | |
| B3-32 | | 0.7 | | | 23.43 | 0.64 | 0.72 | 0.31 | | 72.38 | | 25.13 | 0.97 | 0.35 | 0.18 | | 73.37 | 46.38 | 1.07 | |
| B3-31 | | 0.4 | | | 27.76 | 0.49 | 1.01 | 0.4 | | 67.59 | | 30.10 | 0.74 | 0.50 | 0.24 | | 68.42 | 36.34 | 1.06 | |
| B25 | 0.4 | | 1.1 | | 31.1 | 0.6 | 0.7 | 0.5 | | 65.5 | 0.5 | 33.27 | 0.89 | 0.54 | 0.29 | | 66.24 | 30.07 | 1.05 | |
| B31 | | | | 1.8 | 31 | 1 | | 0.4 | | 66.4 | 0.4 | 32.77 | 1.47 | | 0.23 | | 68.52 | 31.04 | 1.05 | |
| B24 | 0.6 | 0.8 | 4 | 1.3 | 33 | 0.6 | 0.3 | 0.5 | | 64.1 | 0.5 | 33.08 | 0.89 | 0.15 | 0.29 | | 63.60 | 27.05 | 1.05 | |
| B23 | 0.5 | 0.7 | | 2.2 | 35.1 | 0.6 | 0.1 | 0.5 | | 62.3 | 0.5 | 37.18 | 0.88 | 0.05 | 0.29 | | 61.60 | 23.15 | 1.03 | |
| B3-30 | | 0.6 | | | 31.93 | 0.37 | 0.28 | 0.64 | | 64.13 | | 31.41 | 0.55 | 0.14 | 0.38 | | 64.52 | 28.89 | 1.02 | |

TABLE 3

| Comp. | Composition WT % | | | | | | | Composition mol % | | | | | | Solubility | | | | MgO Excess |
|---|---|---|---|---|---|---|---|---|---|---|---|---|---|---|---|---|---|---|
| | CaO | MgO | ZrO2 | Al2O3 | TiO2 | SiO2 | Others | CaO | MgO | ZrO2 | Al2O3 | TiO2 | SiO2 | CaO | MgO | SiO2 | Total | |
| KW-1 | 2.9 | 0.1 | 0.1 | 44.5 | | 31.7 | 0.2 | 3.82 | 0.18 | 0.06 | 32.28 | | 63.63 | | | | | −32.16 |
| CAS4 | 19.7 | 0.4 | 0.2 | 36.6 | | 42.5 | 0.5 | 24.58 | 0.69 | 0.11 | 25.12 | | 49.50 | 3 | | 13 | 18 | −24.34 |
| CAS10 | 50.8 | | | 24.6 | | 23.6 | | 38.52 | | | 19.67 | | 25.51 | 30 | | 9 | 59 | −13.67 |
| B3-3A | 31.64 | 0.67 | 0.41 | 3.91 | | 59.54 | | 34.55 | 1.02 | 0.20 | 3.55 | | 60.68 | 25 | 10 | 30 | 654 | −2.74 |
| B3-2A | 32.5 | 0.48 | 0.12 | 4.15 | | 60.83 | | 35.08 | 0.73 | 0.86 | 2.48 | | 61.65 | 61 | 5 | 58 | 124 | −1.81 |
| BZ-31 | 17.6 | 4.9 | 17.5 | 0.2 | | 59.1 | 0.6 | 29.08 | 7.78 | 9.09 | 0.13 | | 62.95 | 8 | 3 | 12 | 23 | −1.43 |
| BZ-46 | 14.9 | 4.9 | 17.3 | 0.3 | | 61.2 | 0.7 | 17.18 | 7.85 | 9.06 | 0.19 | | 63.73 | 9 | 3 | 16 | 28 | −1.41 |
| BZ-52 | 13.4 | 5 | 17.56 | 0.2 | | 62.8 | 0.6 | 15.39 | 7.99 | 9.13 | 0.13 | | 67.34 | 7 | 3 | 11 | 21 | −1.28 |
| BZ-48 | 18.1 | 4.9 | 15.1 | 0.3 | | 63.8 | 0.6 | 17.10 | 7.72 | 7.78 | 0.39 | | 67.22 | 6 | 3 | 9 | 18 | −0.25 |
| BZ-47 | 18.9 | 3 | 15.2 | 0.5 | | 5P | 0.7 | 21.47 | 7.90 | 7.86 | 0.19 | | 62.37 | 11 | 3 | 17 | 31 | −0.14 |
| BZ-27 | 32.3 | 5 | 15.2 | 0.3 | | 56.4 | 0.7 | 25.04 | 7.82 | 7.77 | 0.19 | | 39.16 | 11 | 3 | 26 | 43 | −0.14 |
| BZ-23 | 26.5 | 5 | 14.9 | 0.3 | | 31.4 | 0.8 | 29.93 | 7.86 | 7.65 | 0.31 | | 34.22 | 17 | | 23 | 45 | −0.11 |
| BZ-19 | 17.4 | 5.1 | 13.4 | 0.3 | | 60.8 | 0.6 | 19.68 | 8.92 | 7.93 | 01.9 | | 64.18 | 8 | 3 | 24 | 35 | −0.09 |
| B3-31 | 27.76 | 0.49 | 1.51 | 0.4 | | 67.59 | | 30.10 | 0.74 | 0.50 | 0.24 | | 68.42 | 50 | 4 | 112 | 166 | 0.00 |
| BZ-25 | 20.7 | 5.2 | 13.5 | 0.3 | | 57.3 | 0.7 | 23.35 | 8.16 | 7.96 | 0.19 | | 64.18 | 8 | 3 | 16 | 27 | 0.02 |
| B3-30 | 31.93 | 0.37 | 0.28 | 0.64 | | 64.13 | | 34.41 | 0.55 | 0.14 | 0.38 | | 64.52 | 83 | 3 | 163 | 249 | 0.04 |
| BZ-27 | 23.8 | 3.1 | 14.8 | 0.4 | | 33.9 | 0.7 | 27.00 | 8.05 | 7.64 | 0.25 | | 37.07 | 11 | 3 | 23 | 42 | 0.16 |
| B25 | 31.1 | 0.6 | 0.7 | 0.5 | | 65.3 | 0.6 | 33.27 | 0.28 | 0.34 | 0.29 | | 63.28 | 80 | | 86 | 136 | 0.26 |
| B3-29 | 36 | 0.68 | 0.17 | 0.92 | | 99.4 | | 38.72 | 1.02 | 0.08 | 0.54 | | 59.63 | 29 | 5 | 201 | 235 | 0.39 |
| B3-32 | 21.43 | 0.65 | 0.72 | 0.31 | | 73.28 | | 25.13 | 0.97 | 0.35 | 0.18 | | 73.37 | X | X | X | X | 0.44 |
| B24 | 33 | 0.6 | 0.5 | 0.5 | | 64.1 | 0.5 | 35.08 | 0.89 | 0.15 | 0.29 | | 63.60 | 57 | | 115 | 172 | 0.43 |
| B23 | 35.1 | 0.6 | 0.1 | 0.5 | | 62.3 | 0.5 | 37.18 | 0.88 | 0.05 | 0.29 | | 61.60 | 61 | | 137 | 198 | 0.54 |
| BZ-45 | 19.5 | 5.8 | 13.1 | 0.4 | | 67.3 | 0.6 | 21.59 | 7.47 | 6.67 | 0.25 | | 64.02 | 13 | 5 | 18 | 36 | 0.55 |
| B22 | 37.1 | 0.7 | 0.1 | 0.6 | | 60.2 | 0.5 | 39.20 | 1.03 | 0.03 | 0.35 | | 39.37 | 64 | | 162 | 226 | 0.63 |
| B21 | 39.1 | 0.7 | | 0.6 | | 38.2 | 0.5 | 41.28 | 1.03 | | 0.33 | | 57.35 | 58 | | 225 | 283 | 0.68 |
| BZ-50 | 17.3 | 8 | 13.7 | 0.2 | | 62.7 | 0.6 | 19.41 | 7.80 | 7.00 | 0.32 | | 66.67 | 13 | 8 | 17 | 35 | 0.69 |
| BZ-49 | 20.9 | 4.9 | 13.2 | 0.3 | | 59.5 | 0.7 | 23.27 | 7.62 | 6.72 | 0.18 | | 62.10 | 11 | 3 | 16 | 30 | 0.72 |
| 708 | 42.85 | 0.77 | | | | 35.22 | | 44.85 | 1.12 | | | | 34.03 | 31 | 2 | 196 | 226 | 1.12 |
| BZ-36 | 16.4 | 8 | 13.6 | 0.2 | | 64.9 | 0.6 | 18.36 | 7.74 | 6.38 | 0.12 | | 67.40 | 8 | 3 | 16 | 27 | 1.24 |
| B31 | 31 | 1 | | 0.4 | | 66.4 | 0.4 | 32.77 | 1.47 | | 0.23 | | 65.52 | | | | | 1.24 |
| BZ-35 | 18.1 | 5 | 12.2 | 0.2 | | 63.2 | 0.5 | 20.18 | 7.75 | 6.19 | 0.12 | | 65.76 | 8 | 3 | 21 | 32 | 1.44 |
| B3-16 | 24.99 | 1.71 | 1.03 | 0.64 | | 68.74 | | 27.06 | 2.58 | 0.31 | 0.39 | | 69.47 | 72 | 10 | 132 | 214 | 1.68 |
| BZ-29 | 18.1 | 3 | 10.2 | 0.9 | | 54.8 | 0.6 | 19.96 | 7.67 | 5.12 | 0.53 | | 66.70 | 10 | 7 | 27 | 44 | 2.01 |
| B3-17 | 26.68 | 1.86 | 0.37 | 0.7 | | 67.25 | | 28.79 | 2.79 | 0.28 | 0.42 | | 67.73 | 49 | 13 | 162 | 224 | 2.10 |
| B3-15 | 29.82 | 1.78 | 0.51 | 0.47 | | 65.86 | | 31.64 | 2.63 | 0.25 | 0.27 | | 64.22 | 38 | 7 | 156 | 201 | 2.11 |
| BZ-7 | 16.3 | 5 | 10.7 | 0.3 | | 67.3 | 0.5 | 17.93 | 7.64 | 5.36 | 0.18 | | 68.88 | 11 | 7 | 21 | 39 | 2.11 |
| BZ-5 | 22.1 | 5.9 | 10.3 | 0.3 | | 80.8 | 0.6 | 24.41 | 7.33 | 2.18 | 0.18 | | 62.69 | 14 | 7 | 22 | 43 | 2.17 |
| BZ-17 | 19 | 5 | 10.4 | 0.4 | | 63.8 | 0.6 | 21.00 | 7.69 | 5.23 | 0.24 | | 65.83 | 14 | 3 | 28 | 45 | 2.21 |
| BZ-30 | 20.2 | 5 | 10.3 | 0.4 | | 63.4 | 0.6 | 22.14 | 7.62 | 5.14 | 0.24 | | 64.85 | 16 | 3 | 33 | 34 | 2.24 |
| BZ-11 | 26.2 | 5 | 10.2 | 0.4 | | 37.4 | 0.8 | 28.60 | 7.59 | 5.07 | 0.24 | | 58.49 | 25 | 7 | 33 | 65 | 2.29 |
| B3-13 | 30.62 | 2.06 | 0.91 | 0.55 | | 62.31 | | 33.14 | 3.10 | 0.45 | 0.31 | | 62.98 | 41 | 7 | 151 | 199 | 2.33 |
| BZ-13 | 52 | 3.1 | 10 | 0.5 | | 30.9 | 0.7 | 35.00 | 7.76 | 4.98 | 0.30 | | 31.96 | 38 | 12 | 42 | 97 | 2.48 |
| B32 | 31 | 2 | 0.1 | 0.5 | | 65.5 | 0.3 | 32.59 | 2.92 | 0.05 | 0.17 | | 64.27 | | | | | 2.70 |
| B3-11 | 33.24 | 2.33 | 0.49 | 0.69 | | 61.71 | | 35.10 | 3.42 | 0.28 | 0.40 | | 60.80 | 28 | 15 | 162 | 205 | 2.74 |
| B3-9 | 34.49 | 2.5 | 0.49 | 0.76 | | 60.28 | | 36.25 | 3.67 | 0.24 | 0.44 | | 59.31 | 8 | 5 | 173 | 216 | 3.13 |
| B3-21 | 16.63 | 2.43 | 0.08 | 0.73 | | 17.38 | | 38.96 | 3.69 | 0.04 | 0.45 | | 56.98 | 25 | 16 | 173 | 216 | 3.13 |
| BZ-34 | 27.2 | 4.9 | 8.1 | 8.5 | | 63.2 | 0.6 | 24.17 | 7.42 | 4.01 | 0.18 | | 64.27 | 35 | 13 | 26 | 24 | 3.23 |
| BZ-31 | 18.3 | 8.1 | 8.6 | 0.3 | | 66.5 | 0.6 | 19.99 | 7.78 | 4.28 | 0.38 | | 67.80 | 13 | 3 | 33 | 49 | 3.29 |
| BZ-33 | 20.8 | 5 | 8.2 | 0.3 | | 56 | 0.6 | 22.11 | 7.58 | 4.06 | 0.18 | | 66.07 | 34 | 15 | 33 | 82 | 3.33 |
| B3-3A | 25.41 | 4.68 | 0.58 | 3.97 | | 63.71 | | 27.07 | 6.94 | 0.28 | 2.33 | | 63.39 | 43 | 11 | 48 | 102 | 3.53 |
| BZ-9 | 31.8 | 5 | 5.1 | 0.6 | | 36 | 0.6 | 33.95 | 7.43 | 2.48 | 0.33 | | 33.80 | 63 | 90 | 133 | 226 | 4.60 |
| B3-1 | 32.56 | 3.8 | 0.82 | 0.79 | | 60.11 | | 34.36 | 5.58 | 0.39 | 0.45 | | 59.21 | 84 | 17 | 156 | 247 | 4.73 |
| BZ-15 | 24.1 | 3 | 3.2 | 0.5 | | 65.8 | 0.4 | 25.88 | 7.47 | 2.54 | 0.18 | | 64.94 | 42 | 17 | 77 | 136 | 4.75 |
| B3-1A | 32.37 | 3.99 | 0.09 | 1.74 | | 60.32 | | 33.92 | 3.84 | 0.04 | 1.01 | | 59.19 | 54 | 31 | 149 | 254 | 4.79 |
| B3-19 | 24.91 | 3.64 | 0.645 | 0.45 | | 67.38 | | 26.61 | 5.42 | 0.32 | 0.26 | | 67.39 | 41 | 21 | 163 | 224 | 4.84 |
| BZ-1 | 26.6 | 3.2 | 3.1 | 0.5 | | 60.3 | 0.7 | 28.69 | 7.80 | 2.50 | 0.30 | | 66.71 | 56 | 30 | 92 | 157 | 3.00 |
| B3-18 | 23.7 | 3.76 | 0.47 | 0.43 | | 69.42 | | 25.16 | 5.55 | 0.23 | 0.25 | | 68.80 | 66 | 17 | 153 | 228 | 3.08 |
| BZT-1 | 24.3 | 4.9 | 3.3 | 0.4 | 1.9 | 64 | 0.5 | 25.88 | 7.26 | 1.60 | 0.23 | 1.42 | 63.61 | 44 | 13 | 68 | 123 | 5.43 |
| B3-5 | 36.07 | 4.44 | 1.46 | 0.58 | | 33.99 | | 37.77 | 6.47 | 0.70 | 0.35 | | 34.73 | 14 | 18 | 185 | 217 | 5.44 |
| BZ-560E | 11.4 | 9 | 1 | 13 | 1.3 | 61.7 | 0.5 | 12.76 | 14.17 | 7.64 | 0.92 | 0.08 | 64.44 | | | | | 5.60 |
| 586 | 35.03 | 3.9 | | 0.13 | | 58.64 | | 36.77 | 5.69 | | 0.08 | | 57.46 | 54 | 19 | 182 | 255 | 5.62 |
| BZ-360E | 11.9 | 9 | 15.1 | 1 | 0.1 | 61.6 | 0.4 | 13.31 | 14.00 | 7.69 | 0.62 | 0.08 | 64.31 | | | | | 5.70 |
| BZ-60 | 8.1 | 9.7 | 18.2 | 0.1 | | 63.1 | 0.4 | 9.12 | 15.19 | 9.33 | 0.06 | | 66.30 | 6 | 3 | 21 | 38 | 5.80 |
| B3-4A | 25.11 | 4.88 | 0.24 | 2.05 | | 65.6 | | 27.18 | 7.15 | 0.12 | 1.19 | | 64.37 | 52 | 16 | 82 | 150 | 5.85 |
| BZ-440E | 16.9 | 6.5 | 5.8 | 1.7 | 0.1 | 68.4 | 0.4 | 18.09 | 9.68 | 2.85 | 1.00 | 0.08 | 68.3 | | | | | 5.85 |
| BZ-660C | 11.7 | 9.1 | 15 | 0.1 | 0.1 | 62.7 | 0.9 | 32.98 | 14.05 | 7.88 | 0.06 | 0.98 | 64.95 | | | | | 6.11 |
| BZ-660 | 11.7 | 9 | 15.1 | 0.1 | 0.1 | 62.9 | 0.5 | 23.01 | 13.92 | 7.64 | 0.06 | 0.08 | 65.29 | 4 | 5 | 18 | 27 | 6.22 |
| 660 | 34.65 | 4.83 | | 1.15 | | 37.74 | | 36.13 | 7.01 | | 0.66 | | 56.20 | 69 | 23 | 132 | 244 | 6.35 |
| BZ-54 | 10.5 | 9.9 | 17.6 | 0.1 | | 61.4 | 0.6 | 11.71 | 15.36 | 8.93 | 0.12 | | 61.64 | 8 | 7 | 23 | 38 | 6.51 |
| BZ-660A | 11.7 | 9.1 | 13.1 | | 0.1 | 62.3 | 0.8 | 13.06 | 14.12 | 7.61 | 0.06 | 0.08 | 68.07 | | | | | 6.45 |
| BZ-360B | 12 | 9.1 | 15.1 | | 0.1 | 62.3 | 1.5 | 13.37 | 14.11 | 7.68 | | 0.08 | 64.79 | | | | | 6.45 |
| BZ-59 | 12.4 | 39 | 37.5 | 0.2 | | 59.2 | 0.7 | 13.83 | 15.52 | 8.88 | 0.12 | | 61.64 | 8 | 7 | 23 | 38 | 6.61 |
| 712 | 33.39 | 4.61 | | 0.06 | | 57.34 | | 37.04 | 6.71 | | 0.03 | | 36.21 | 24 | 22 | 160 | 206 | 6.68 |
| BT-1 | 26.2 | 4.9 | 0.1 | 0.4 | 2.8 | 64.3 | 0.4 | 27.30 | 7.16 | 0.05 | 0.23 | 2.06 | 63.00 | 38 | 17 | 117 | 192 | 6.88 |
| BT-3 | 22.3 | 4.9 | 0.3 | 0.4 | 6.6 | 64.1 | 0.3 | 23.74 | 7.26 | 0.15 | 0.23 | 4.93 | 63.69 | 45 | 19 | 116 | 180 | 6.88 |

TABLE 3-continued

| | Composition WT % | | | | | | | Composition mol % | | | | | | Solubility | | | | MgO |
|---|---|---|---|---|---|---|---|---|---|---|---|---|---|---|---|---|---|---|
| Comp. | CaO | MgO | ZrO2 | Al2O3 | TiO2 | SiO2 | Others | CaO | MgO | ZrO2 | Al2O3 | TiO2 | SiO2 | CaO | MgO | SiO2 | Total | Excess |
| BT-2 | 23.7 | 4.9 | 0.1 | 0.4 | 4.8 | 64.9 | 0.3 | 23.02 | 7.20 | 0.05 | 0.21 | 3.36 | 63.93 | 46 | 18 | 112 | 175 | 6.92 |
| BZ-56 | 10.4 | 9.8 | 15.7 | 0.1 | | 63.7 | 0.5 | 11.47 | 15.02 | 7.88 | 0.06 | | 65.56 | 8 | 7 | 15 | 30 | 7.09 |
| BZ-20 | 12.4 | 9.9 | 15.8 | 0.2 | | 61.5 | 0.5 | 13.64 | 15.16 | 7.91 | 0.12 | | 63.17 | 7 | 7 | 27 | 41 | 7.12 |
| BZ-114 | 17.5 | 9.9 | 7.4 | 0.2 | | 68 | 0.4 | 18.34 | 14.43 | 3.53 | 0.12 | | 63.58 | 21 | 11 | 39 | 71 | 10.79 |
| 725 | 22.13 | 7.54 | | 0.1 | | 61.83 | | 29.18 | 10.88 | | 0.06 | | 39.88 | 76 | 33 | 186 | 297 | 10.83 |
| BZ-111 | 30.3 | 9.8 | 7.1 | 0.2 | | 62.6 | 0.4 | 21.42 | 14.39 | 3.41 | 0.12 | | 69.67 | 24 | 18 | 42 | 79 | 10.88 |
| BZ-415 | 16 | 10 | 7 | 0.5 | | 66.5 | 0.4 | 14.76 | 14.58 | 3.34 | 0.29 | | 68.03 | 21 | 13 | 38 | 72 | 10.98 |
| BZ-407 | 19 | 9.7 | 4.5 | 0.2 | | 63.3 | 0.4 | 20.03 | 14.23 | 3.12 | 0.12 | | 62.30 | 22 | 16 | 42 | 80 | 10.99 |
| BZ-409 | 17.4 | 9.9 | 6.8 | 0.2 | | 65.8 | 0.4 | 18.16 | 14.38 | 3.23 | 0.11 | | 64.11 | 20 | 13 | 45 | 78 | 11.03 |
| BZ-410 | 16.4 | 9.8 | 6.6 | 0.1 | | 66.8 | 0.4 | 17.18 | 14.28 | 3.15 | 0.06 | | 65.33 | 21 | 13 | 38 | 72 | 11.08 |
| BZ-4 | 16.2 | 9.7 | 6.7 | 0.8 | | 67.4 | 0.4 | 16.97 | 14.23 | 2.72 | 0.29 | | 65.89 | 21 | 13 | 47 | 81 | 11.13 |
| BZ-405 | 20.2 | 9.8 | 6.4 | 0.2 | | 62.6 | 0.3 | 21.20 | 14.31 | 3.06 | 0.12 | | 61.33 | 38 | 20 | 61 | 119 | 11.14 |
| BZ-402 | 15.1 | 9.4 | 5.1 | 0.2 | | 65.8 | 0.4 | 19.05 | 13.96 | 2.44 | 0.12 | | 64.65 | 32 | 20 | 60 | 112 | 11.20 |
| BZ-441 | 15 | 11.2 | 11 | 0.1 | | 62.4 | 0.3 | 15.98 | 36.60 | 8.33 | 0.06 | | 62.04 | 11 | 11 | 27 | 49 | 11.21 |
| BZ-2 | 21.7 | 9.6 | 5.2 | 0.5 | | 61.9 | 0.5 | 22.73 | 13.99 | 2.48 | 0.29 | | 60.57 | 33 | 25 | 69 | 129 | 11.22 |
| BZ-401 | 18.2 | 9.7 | 8.4 | 0.3 | | 64.7 | 0.5 | 19.03 | 14.11 | 2.57 | 0.17 | | 64.12 | 28 | 20 | 54 | 102 | 11.37 |
| BZ16 | 19.2 | 9.7 | 5.3 | 0.3 | | 64.9 | 0.4 | 20.04 | 14.09 | 2.47 | 0.37 | | 63.23 | 30 | 22 | 60 | 112 | 11.44 |
| BZ-400 | 17.1 | 9.7 | 5.4 | 0.2 | | 66.6 | 0.4 | 17.94 | 14.16 | 2.58 | 0.32 | | 65.23 | 30 | 22 | 61 | 113 | 11.45 |
| 719 | 25.69 | 8.12 | | | | 65.77 | | 26.11 | 11.48 | | | | 62.40 | 31 | 24 | 115 | 190 | 11.48 |
| BZ-160 | 19.3 | 9.7 | 6.1 | 0.3 | 0.1 | 64.8 | 0.4 | 20.14 | 14.08 | 2.42 | 0.17 | 0.07 | 63.11 | 26 | 19 | 60 | 95 | 11.49 |
| BZ-421 | 20.2 | 9.8 | 4.9 | 0.9 | | 64.7 | 0.5 | 20.81 | 14.12 | 2.03 | 0.51 | | 62.33 | 76 | 19 | 54 | 98 | 11.58 |
| BZ-39 | 21.2 | 9.8 | 5.1 | 0.3 | | 62.8 | 0.6 | 22.10 | 14.21 | 2.42 | 0.17 | | 61.10 | 59 | 43 | 88 | 190 | 11.62 |
| BZ-416 | 19.5 | 9.8 | 5.2 | 0.2 | | 64.7 | 0.4 | 20.15 | 14.23 | 2.47 | 0.11 | | 63.04 | 28 | 19 | 34 | 101 | 11.65 |
| BZ-403 | 17.4 | 9 | 5.8 | 0.2 | | 66.1 | 0.4 | 18.17 | 14.59 | 2.76 | 0.11 | | 64.43 | 31 | 19 | 60 | 110 | 11.66 |
| 714 | 32 | 8.27 | | | | 59.05 | | 32.45 | 11.67 | | | | 55.89 | 73 | 90 | 142 | 245 | 11.67 |
| BZ-405 | 20.1 | 9.9 | 5.4 | 0.3 | | 63.2 | 0.3 | 21.05 | 14.42 | 2.57 | 0.17 | | 61.78 | 44 | 25 | 78 | 147 | 11.68 |
| BZ-40 | 20.9 | 9.8 | 5 | 0.4 | | 62.4 | 0.6 | 21.94 | 14.31 | 2.59 | 0.23 | | 61.15 | 44 | 33 | 94 | 171 | 11.69 |
| BZ-404 | 16.1 | 10 | 8.4 | 0.1 | | 67.7 | 0.4 | 16.82 | 14.53 | 2.57 | 0.06 | | 66.02 | 35 | 20 | 67 | 122 | 11.91 |
| BZ-10 | 27.1 | 10 | 5 | 0.4 | | 56 | 0.6 | 28.29 | 14.53 | 2.18 | 0.23 | | 34.38 | 41 | 35 | 90 | 166 | 11.92 |
| BZ-417 | 19.4 | 9.7 | 4.1 | 0.2 | | 66.1 | 0.4 | 20.09 | 13.97 | 1.93 | 0.11 | | 63.89 | 28 | 19 | 56 | 103 | 11.93 |
| BZ-420 | 16.4 | 9.9 | 4.7 | 0.2 | 0.1 | 68.3 | 0.3 | 17.04 | 14.31 | 2.22 | 0.11 | 0.09 | 66.24 | 28 | 17 | 55 | 98 | 11.97 |
| BZ-419 | 17 | 9.9 | 4.6 | 0.2 | | 67.3 | 0.4 | 17.76 | 14.39 | 2.19 | 0.11 | | 63.34 | 22 | 16 | 39 | 77 | 12.09 |
| BZ-422 | 20.2 | 9.8 | 5.6 | 0.2 | | 63.3 | 0.4 | 20.93 | 14.12 | 1.70 | 0.11 | | 63.14 | 38 | 26 | 71 | 133 | 12.31 |
| BZ-423 | 19.1 | 9.8 | 3.5 | 0.2 | | 66.9 | 0.4 | 19.71 | 14.07 | 1.64 | 0.11 | | 64.06 | 33 | 25 | 72 | 130 | 12.31 |
| BZ-425 | 17 | 9.7 | 3.4 | 0.2 | | 68.5 | 0.3 | 17.69 | 14.04 | 1.61 | 0.11 | | 65.54 | 30 | 25 | 41 | 96 | 12.32 |
| BZ-426 | 16.3 | 9.8 | 3.6 | 0.2 | | 69.4 | 0.3 | 16.90 | 14.13 | 1.70 | 0.11 | | 67.16 | 29 | 25 | 56 | 108 | 12.32 |
| BZ-418 | 18.3 | 10 | 4.1 | 0.2 | | 66.8 | 0.4 | 18.96 | 14.41 | 1.93 | 0.11 | | 64.39 | 28 | 17 | 51 | 96 | 12.36 |
| BZ-41 | 25.1 | 9.8 | 3 | 0.4 | | 62.5 | 0.6 | 25.90 | 14.11 | 1.41 | 0.23 | | 60.36 | 57 | 47 | 122 | 236 | 12.47 |
| BZ-37 | 21.1 | 9.8 | 3.2 | 0.6 | | 64.2 | 0.5 | 21.92 | 14.16 | 1.31 | 0.17 | | 62.24 | 42 | 40 | 97 | 189 | 12.48 |
| BZ-424 | 18.4 | 9.9 | 3.5 | 0.2 | | 67.1 | 0.3 | 19.07 | 14.27 | 1.65 | 0.11 | | 64.90 | 28 | 22 | 51 | 101 | 12.51 |
| D12 | 15.7 | 10.4 | 5.5 | 0.1 | 2.7 | 67.6 | 0.5 | 14.33 | 13.13 | 2.52 | 0.06 | 1.98 | 65.98 | 22 | 19 | 41 | 34 | 12.55 |
| BZ-42 | 19.1 | 9.9 | 3 | 0.2 | | 66.7 | 0.5 | 19.77 | 14.26 | 1.41 | 0.11 | | 64.45 | 82 | 43 | 99 | 194 | 12.73 |
| B21 | 22.3 | 9.3 | 0.6 | 0.2 | 0.1 | 67.1 | 0.2 | 22.68 | 13.16 | 0.28 | 0.11 | 0.07 | 63.79 | 44 | 33 | 112 | 189 | 12.77 |
| BZ-4130B | 14.3 | 11.5 | 7.1 | 1.1 | 0.1 | 64.2 | 0.4 | 16.08 | 16.82 | 3.40 | 0.64 | 0.07 | 62.99 | | | | | 12.79 |
| B3-22 | 21.28 | 9.34 | 0.54 | 0.52 | | 66.17 | | 22.04 | 13.46 | 0.25 | 0.30 | | 63.96 | 62 | 57 | 174 | 292 | 12.90 |
| B3-25 | 28.15 | 9.22 | | 0.48 | | 59.53 | | 29.08 | 13.25 | | 0.27 | | 57.40 | 48 | 33 | 133 | 214 | 12.98 |
| B3-23 | 21.26 | 9.33 | 0.3 | 0.56 | | 64.09 | | 24.10 | 13.45 | 0.14 | 0.32 | | 61.99 | 44 | 31 | 101 | 176 | 12.99 |
| BZ-38 | 17.2 | 11.2 | 6.7 | 0.2 | | 63.3 | 0.4 | 18.06 | 16.36 | 3.20 | 0.32 | | 62.25 | 40 | 32 | 60 | 332 | 13.05 |
| B3-26 | 30.3 | 9.44 | | 0.62 | | 36.98 | | 31.39 | 13.52 | | 0.36 | | 54.74 | 64 | 41 | 149 | 214 | 13.17 |
| BZ-4150A | 15.3 | 11.6 | 7.2 | 0.2 | 0.1 | 64.3 | 0.7 | 16.11 | 16.84 | 3.43 | 0.12 | 0.07 | 63.40 | | | | | 13.25 |
| BZ-4180 | 15.2 | 11.7 | 7.4 | 0.1 | 0.1 | 65.3 | 0.3 | 15.85 | 16.97 | 3.51 | 0.06 | 0.07 | 63.54 | 17.00 | 14.00 | 37.00 | 68 | 13.40 |
| A2-16 | 12.4 | 10.09 | 2.23 | 0.19 | | 75.43 | | 12.90 | 14.61 | 1.06 | 0.11 | | 71.32 | 45 | 55 | 113 | 213 | 13.94 |
| D11 | 14.4 | 11.1 | 5.3 | 0.1 | 2.7 | 66.4 | 0.3 | 14.97 | 16.06 | 2.31 | 0.06 | 1.97 | 64.44 | 22 | 28 | 45 | 95 | 13.19 |
| BZ-435 | 16.6 | 11.3 | 5.3 | 0.6 | | 64.9 | 0.7 | 17.36 | 16.44 | 2.82 | 0.33 | | 63.34 | 29 | 30 | 68 | 127 | 13.51 |
| B3-24 | 25.53 | 9.73 | | 0.58 | | 61.62 | | 26.36 | 13.97 | | 0.33 | | 59.36 | 37 | 57 | 185 | 279 | 13.64 |
| D3 | 13.6 | 11.3 | 3.7 | 0.1 | 1 | 67.3 | 0.3 | 14.24 | 16.46 | 2.72 | 0.06 | 0.74 | 63.79 | 13 | 15 | 45 | 73 | 13.69 |
| BZ-4130C | 14.5 | 11.9 | 7.5 | 0.1 | 0.1 | 63.9 | 0.8 | 16.27 | 17.38 | 3.58 | 0.06 | 0.07 | 62.63 | | | | | 13.74 |
| BZ-433 | 15.2 | 11.5 | 5.4 | 0.2 | | 65.8 | 0.9 | 16.84 | 16.63 | 2.56 | 0.11 | | 63.83 | 26 | 20 | 55 | 101 | 13.96 |
| D2 | 18.4 | 11.6 | 5.8 | 0.2 | 1 | 65 | 0.3 | 16.10 | 16.87 | 2.53 | 0.06 | 1.46 | 64.23 | 18 | 18 | 46 | 82 | 14.00 |
| B18 | 22.8 | 10.2 | 0.5 | 0.3 | 0.1 | 64.8 | 0.2 | 23.28 | 14.49 | 0.23 | 0.17 | 0.07 | 61.76 | 33 | 49 | 137 | 232 | 14.09 |
| D5 | 14.5 | 11.7 | 5.4 | 0.1 | 2 | 66.4 | 0.4 | 14.82 | 16.87 | 2.53 | 0.06 | 1.46 | 64.23 | 24 | 19 | 41 | 87 | 14.27 |
| D10 | 15.7 | 11.7 | 4.9 | 0.1 | 2.7 | 64.7 | 0.3 | 16.26 | 16.86 | 2.31 | 0.06 | 1.96 | 62.55 | 22 | 20 | 49 | 82 | 14.49 |
| BZA-6 | 17.2 | 11.9 | 3.4 | 1.4 | | 64.5 | 0.4 | 17.71 | 17.03 | 1.39 | 0.79 | | 62.86 | 19 | 21 | 30 | 90 | 14.66 |
| BZ-437 | 18 | 12.2 | 6.1 | 0.1 | | 65.7 | 0.3 | 15.60 | 17.66 | 2.89 | 0.06 | | 63.79 | 24 | 24 | 55 | 103 | 14.71 |
| BZ-440 | 15.9 | 12.1 | 5 | 0.2 | | 65.7 | 0.9 | 15.47 | 17.44 | 2.45 | 0.11 | | 63.29 | 27 | 49 | 103 | 14.87 | |
| D4 | 16.4 | 12.2 | 5.4 | 0.2 | 1.8 | 62.8 | 0.3 | 17.11 | 17.71 | 2.56 | 0.11 | 1.92 | 61.17 | 21 | 20 | 30 | 91 | 15.03 |
| BZA-5 | 17.1 | 11.9 | 3.1 | 1 | 0.1 | 64.7 | 0.4 | 17.63 | 17.07 | 1.45 | 0.57 | 0.07 | 63.21 | 11 | 18 | 47 | 83 | 15.04 |
| BZA-4 | 17 | 11.9 | 3.1 | 0.7 | | 65.8 | 0.4 | 17.57 | 17.11 | 1.46 | 0.40 | | 63.47 | 21 | 21 | 47 | 89 | 15.25 |
| D1 | 16.3 | 12.5 | 5.6 | 0.1 | 1 | 63.3 | 0.3 | 16.96 | 18.10 | 2.65 | 0.06 | 0.73 | 61.59 | 22 | 22 | 59 | 103 | 13.39 |
| BZ-440A | 16.4 | 12.6 | 5.3 | 0.1 | 0.1 | 64.6 | 0.7 | 16.93 | 18.12 | 2.49 | 0.06 | 0.07 | 62.31 | | | | | 15.37 |
| BZ-440C | 16.2 | 12.6 | 5.3 | 0.1 | 0.1 | 64.3 | 0.8 | 16.82 | 18.21 | 2.51 | 0.06 | 0.07 | 62.33 | | | | | 15.64 |
| B14 | 20.3 | 11.4 | | 0.7 | 0.1 | 67.1 | 0.21 | 20.51 | 16.02 | | 0.11 | 0.07 | 63.28 | 47 | 42 | 112 | 201 | 15.91 |
| D9 | 15.9 | 12 | 1.87 | 0.1 | 0.9 | 68.2 | 0.2 | 16.26 | 17.07 | 0.87 | 0.06 | 0.63 | 65.10 | 37 | 41 | 78 | 156 | 16.15 |
| A2-14 | 25.3 | 11.66 | 0.16 | 0.28 | | 60.74 | | 25.70 | 16.48 | 0.07 | 0.16 | | 57.59 | 57 | 42 | 127 | 227 | 16.25 |
| BZA-2 | 18.5 | 12.2 | 0.6 | 1 | | 66.4 | 0.3 | 18.02 | 17.27 | 0.28 | 0.56 | | 63.07 | 25 | 24 | 66 | 113 | 16.43 |

TABLE 3-continued

| | Composition WT % | | | | | | | Composition mol % | | | | | | Solubility | | | | MgO |
|---|---|---|---|---|---|---|---|---|---|---|---|---|---|---|---|---|---|---|
| Comp. | CaO | MgO | ZrO2 | Al2O3 | TiO2 | SiO2 | Others | CaO | MgO | ZrO2 | Al2O3 | TiO2 | SiO2 | CaO | MgO | SiO2 | Total | Excess |
| BZA-3 | 18.6 | 12.4 | 0.6 | 1.4 | | 65.8 | 0.3 | 18.92 | 17.55 | 0.28 | 0.78 | | 63.47 | 24 | 34 | 61 | 109 | 16.49 |
| BZA-1 | 11.5 | 12.2 | 0.6 | 0.6 | | 67.1 | 0.3 | 18.74 | 17.19 | 0.28 | 0.33 | | 63.45 | 25 | 25 | 69 | 119 | 16.58 |
| A2-7 | 23.37 | 11.98 | 0.23 | 0.44 | | 61.98 | | 23.79 | 16.97 | 0.11 | 0.25 | | 58.89 | 59 | 63 | 178 | 300 | 16.61 |
| B13 | 21.3 | 12.3 | 0.6 | 0.2 | 0.1 | 65.6 | 0.5 | 21.28 | 17.10 | 0.27 | 0.11 | 0.07 | 61.17 | 43 | 39 | 96 | 178 | 16.71 |
| B4 | 18.8 | 12.2 | 0.7 | 0.2 | | 66.8 | 0.7 | 19.08 | 17.22 | 0.32 | 0.11 | | 63.27 | 33 | 51 | 89 | 144 | 16.79 |
| A2-15 | 12.67 | 12.35 | 1.24 | 0.11 | | 72.25 | | 12.94 | 17.55 | 0.58 | 0.06 | | 68.88 | 35 | 48 | 105 | 188 | 16.91 |
| A2-9 | 21.44 | 12.96 | | 1.49 | | 63.66 | | 21.50 | 11.08 | | 0.82 | | 59.59 | 67 | 66 | 195 | 328 | 17.26 |
| A2-6 | 15.17 | 12.76 | 1.13 | 0.07 | | 69.29 | | 15.46 | 11.09 | 0.52 | 0.04 | | 65.89 | 48 | 70 | 152 | 270 | 17.52 |
| D8 | 16.9 | 13.2 | 1.8 | 0.4 | 1 | 66.2 | 0.2 | 17.11 | 18.59 | 0.83 | 0.22 | 0.71 | 62.54 | 33 | 39 | 66 | 140 | 17.54 |
| B7 | 17.9 | 13.1 | 0.8 | 0.3 | | 67.8 | 0.2 | 17.91 | 18.24 | 0.36 | 0.17 | | 63.32 | 44 | 45 | 110 | 199 | 17.71 |
| 759 | 17.45 | 12.6 | | | | 68.33 | | 17.67 | 17.75 | | | | 64.58 | 38 | 40 | 117 | 195 | 17.75 |
| D7 | 18.5 | 13.3 | 1.7 | 0.2 | 1 | 65.1 | 0.2 | 18.87 | 18.85 | 0.78 | 0.11 | 0.70 | 60.99 | 34 | 36 | 63 | 133 | 17.95 |
| A2-18 | 26.29 | 13.01 | | 0.56 | | 36.95 | | 26.83 | 18.48 | | 0.37 | | 54.30 | 47 | 57 | 161 | 263 | 18.11 |
| B12 | 22 | 13.2 | 0.1 | 0.2 | 0.1 | 63.3 | 0.2 | 22.02 | 18.39 | 0.05 | 0.11 | 0.07 | 59.35 | 45 | 53 | 106 | 194 | 18.25 |
| A2-11 | 24.28 | 13.24 | 0.08 | 0.25 | | 60.32 | | 24.48 | 18.57 | 0.04 | 0.14 | | 36.77 | 72 | 16 | 119 | 207 | 18.40 |
| 924 | 19.78 | 14.54 | 0.66 | 2.57 | | 61.32 | | 19.99 | 20.44 | 0.30 | 1.43 | | 57.84 | 36 | 37 | 77 | 150 | 18.71 |
| B7A | 18.3 | 15.7 | 0.3 | 0.2 | 0.1 | 66.8 | 0.6 | 18.29 | 19.03 | 0.14 | 0.11 | 0.07 | 62.33 | | | | | 18.82 |
| B7D | 18.3 | 13.8 | 0.8 | 0.2 | 0.1 | 65.5 | 1.3 | 18.43 | 19.36 | 0.37 | 0.11 | 0.07 | 61.64 | | | | | 18.88 |
| A2-5 | 11.74 | 13.78 | 0.14 | 0.18 | | 65.69 | | 11.85 | 19.29 | 0.06 | 0.10 | | 61.69 | 48 | 60 | 150 | 258 | 19.12 |
| B7C | 18 | 13.8 | 0.2 | 0.1 | | 66.6 | 0.7 | 18.09 | 19.29 | 0.09 | 0.06 | | 62.47 | | | | | 19.13 |
| B6 | 19.2 | 14.2 | 0.1 | 0.2 | | 66.1 | 0.4 | 19.05 | 19.60 | 0.06 | 0.11 | | 61.20 | 50 | 55 | 144 | 247 | 19.44 |
| A2-8 | 16.86 | 14.24 | 1.17 | 0.22 | | 65.69 | | 11.86 | 19.29 | 0.06 | 0.10 | | 61.69 | 54 | 84 | 181 | 319 | 19.49 |
| A2-17 | 11.58 | 14.32 | 1.58 | 0.15 | | 70.43 | | 11.78 | 20.55 | 0.73 | 0.08 | | 66.86 | 35 | 72 | 91 | 198 | 19.73 |
| B11 | 15.8 | 15 | 0.4 | 0.2 | 0.1 | 68.6 | 0.3 | 15.63 | 20.65 | 0.18 | 0.11 | 0.07 | 63.36 | 31 | 45 | 101 | 178 | 20.36 |
| B5 | 19.9 | 15.1 | 0.1 | 0.2 | | 64.2 | 0.4 | 19.71 | 20.80 | 0.05 | 0.11 | | 59.34 | 45 | 48 | 99 | 190 | 20.65 |
| 952 | 21.6 | 15.65 | 0.11 | 1.3 | | 59.85 | | 21.38 | 21.73 | 0.05 | 0.87 | | 55.80 | 41 | 43 | 92 | 176 | 20.87 |
| 757 | 20.92 | 15.22 | | 0.2 | | 62.6 | | 20.79 | 21.04 | | 0.11 | | 58.06 | 62 | 73 | 187 | 322 | 20.93 |
| B17 | 14.2 | 15.5 | 0.1 | 0.1 | 0.1 | 69.1 | 0.2 | 14.14 | 21.47 | 0.06 | 0.06 | 0.07 | 64.22 | 32 | 45 | 91 | 168 | 21.37 |
| B10 | 16.8 | 15.9 | 0.3 | 0.2 | 0.1 | 67.1 | 0.2 | 16.49 | 21.71 | 0.13 | 0.11 | 0.07 | 61.48 | 30 | 43 | 93 | 168 | 21.47 |
| A2-10 | 16.22 | 15.8 | | 0.49 | | 66.17 | | 16.18 | 21.93 | | 0.27 | | 61.62 | 42 | 82 | 123 | 216 | 21.66 |
| A2-13 | 14.87 | 16.01 | 0.92 | 0.11 | | 66.67 | | 14.89 | 22.31 | 0.42 | 0.06 | | 62.32 | 47 | 70 | 159 | 276 | 21.83 |
| A2-22 | 9.36 | 16.34 | 0.83 | 0.33 | | 71.48 | | 9.42 | 22.88 | 0.38 | 0.18 | | 67.14 | 36 | 75 | 126 | 237 | 22.31 |
| 754 | 26.62 | 17.03 | 0.03 | 1 | | 36.38 | | 25.66 | 22.87 | 0.02 | 0.33 | | 50.92 | 32 | 66 | 185 | 253 | 22.32 |
| B19 | 13.9 | 16.8 | 0.7 | 0.1 | 0.1 | 68.7 | 0.1 | 13.65 | 22.95 | 0.31 | 0.06 | 0.07 | 67.97 | 29 | 49 | 114 | 192 | 22.58 |
| A2-20 | 11.58 | 16.47 | 0.91 | 0.4 | | 68.19 | | 11.71 | 23.30 | 0.42 | 0.22 | | 64.35 | 33 | 69 | 162 | 262 | 22.66 |
| 973 | 24.45 | 16.81 | 0.05 | 0.5 | | 36.18 | | 24.31 | 23.25 | 0.02 | 0.27 | | 52.14 | 42 | 47 | 102 | 191 | 22.96 |
| A2-28 | 2.07 | 17.13 | 1.76 | 0.15 | | 78.07 | | 2.01 | 23.93 | 0.80 | 0.08 | | 73.10 | X | X | X | X | 23.05 |
| B9 | 18.1 | 17.1 | 0.1 | 0.2 | | 64.4 | 0.2 | 17.72 | 23.29 | 0.04 | 0.11 | | 58.84 | 32 | 44 | 101 | 177 | 23.14 |
| 971 | 25.92 | 17.36 | 0.06 | 0.74 | | 56.82 | | 23.56 | 23.79 | 0.02 | 0.40 | | 32.23 | 35 | 73 | 142 | 270 | 23.56 |
| B8 | 18.8 | 17.9 | 0.3 | 0.2 | | 63 | 0.2 | 18.30 | 24.24 | 0.13 | 0.11 | | 57.23 | 30 | 39 | 90 | 159 | 24.00 |
| B16 | 13.1 | 18.1 | 0.3 | 0.1 | 0.1 | 66 | 0.2 | 14.78 | 24.61 | 0.13 | 0.06 | 0.07 | 60.31 | 35 | 64 | 131 | 230 | 24.46 |
| A2-12 | 16.55 | 18 | 0.06 | 0.33 | | 63.56 | | 16.37 | 24.76 | 0.02 | 0.18 | | 58.67 | 47 | 66 | 160 | 273 | 24.56 |
| A2-30 | 16.06 | 18.21 | | 0.4 | | 63.68 | | 15.89 | 25.07 | | 0.22 | | 68.82 | 33 | 52 | 102 | 117 | 24.85 |
| A2-23 | 18.59 | 18.78 | 0.05 | 0.48 | | 60.2 | | 18.37 | 25.81 | 0.02 | 0.26 | | 53 | 35 | 47 | 192 | 274 | 25.53 |
| A2-26 | 8.12 | 19.2 | 0.98 | 0.29 | | 68.65 | | 8.13 | 2.90 | 0.45 | 0.16 | | 64.34 | 31 | 97 | 183 | 311 | 26.29 |
| A2-32 | 6.36 | 19.6 | 0.36 | 0.23 | | 73.09 | | 6.23 | 26.70 | 0.16 | 0.12 | | 66.79 | X | X | X | X | 26.41 |
| A2-27 | 6.77 | 19.64 | 1.01 | 0.24 | | 71.14 | | 6.70 | 27.08 | 0.45 | 0.13 | | 65.69 | 24 | 67 | 101 | 192 | 26.44 |
| 71 | 24.04 | 29.66 | | 0.2 | | 34.68 | | 23.44 | 26.67 | | 0.11 | | 49.77 | 55 | 62 | 133 | 250 | 26.57 |
| A2-19 | 18.48 | 19.74 | | 0.54 | | 58.71 | | 18.29 | 27.38 | | 0.29 | | 34.21 | 42 | 66 | 125 | 233 | 26.89 |
| A2-21 | 13.74 | 19.98 | 0.13 | 0.34 | | 65.16 | | 13.51 | 27.34 | 0.06 | 0.11 | | 68.90 | 21 | 55 | 160 | 244 | 27.10 |
| A2-31 | 8.45 | 21.72 | 0.64 | 0.32 | | 67.62 | | 8.26 | 29.55 | 0.28 | 0.17 | | 61.73 | 26 | 72 | 103 | 201 | 29.09 |
| A2-29 | 4.46 | 22.31 | 1.21 | 0.19 | | 71.24 | | 4.35 | 30.23 | 0.55 | 0.10 | | 64.77 | 21 | 105 | 94 | 220 | 29.59 |
| A2-33 | 4.61 | 22.85 | 1.01 | 0.25 | | 70.04 | | 4.50 | 31.05 | 0.45 | 0.13 | | 63.86 | X | X | X | X | 30.47 |
| A2-24 | 13.62 | 22.74 | 0.08 | 0.31 | | 61.38 | | 13.23 | 30.79 | 0.04 | 0.17 | | 55.76 | 27 | 87 | 136 | 250 | 29.59 |
| A2-25 | 10.99 | 24.18 | 0.07 | 0.33 | | 62.36 | | 10.66 | 32.64 | 0.03 | 0.18 | | 56.48 | 33 | 103 | 160 | 300 | 32.44 |
| A2-33 | 8.88 | 24.88 | 0.47 | 0.29 | | 64.12 | | 8.56 | 33.37 | 0.21 | 0.15 | | 57.71 | 18 | 106 | 61 | 185 | 33.01 |
| A2-34 | 6.63 | 26.2 | 0.8 | 0.25 | | 64.83 | | 6.37 | 33.01 | 0.35 | 0.12 | | 58.13 | 11 | 119 | 89 | 169 | 31.34 |
| 765 | 3.9 | 35.07 | | 2.12 | | 57.78 | | 5.62 | 43.26 | | 1.08 | | 30.04 | 16 | 169 | 100 | 285 | 44.18 |

I claim:

1. A refractory fibre for which a vacuum cast perform of the fibre has a shrinkage of 3.5% or less when exposed to 1260° C. for 24 hours, at least 98 mol % of the fiber composition consisting of CaO, SiO$_2$, MgO, ZrO$_2$, and optionally Al$_2$O$_3$, and in which;

the amount of Al$_2$O$_3$, if present, does not exceed 0.75 mol %;

the amount of CaO in mol % is greater than the amount of MgO in mol % and is less than the sum of the amount of MgO in mol % and twice the amount of any ZrO$_2$ in mol; and the amount of SiO$_2$ remaining after the CaO and MgO and any ZrO$_2$ are crystallized as silicates exceeds 21.8 mol %.

2. A refractory fibre as claimed in claim 1 further comprising, as an incidental impurity, TiO$_2$ in an amount less than 1.25 mol %.

3. A refractory fibre as claimed in claim 1 further comprising, as an incidental impurity, Na$_2$O in an amount less than 1.0 wt %.

4. A refractory fibre as claimed in claim 1 further comprising, as an incidental impurity, Fe$_2$O$_3$ in an amount less than 1.0 wt %.

5. A refractory fibre as claimed in claim 1 in which $Al_2O_3$ is present in an amount less than 0.5 mol %.

6. A refractory fibre as claimed in any one of claims 1 to 5 and which is saline soluble.

7. A refractory fibre as claimed in claim 6 in which the amount of MgO less the sum of the amounts of $Al_2O_3$ plus an $ZrO_2$ exceeds 10 mol %.

8. A refractory fibre as claimed in claim 7 in which the amount of MgO less the sum of the amounts of $Al_2O_3$ plus any $ZrO_2$ exceeds 11.3 mol %.

9. A refractory fibre as claimed in claim 8 in which the amount of MgO less the sum of the amounts of $Al_2O_3$ plus any $ZrO_2$ exceeds 15.25 mol %.

10. A method of providing refractory properties to an article comprising (a) selecting a saline soluble refractor fibre as claimed in any one of claims 1 to 5 or 7 to 9, (b) associating the saline soluble refractory fibre in or with an article, and (c) subjecting the fibre and article to an elevated temperature of at least 1000° C. for at least 24 hours.

11. The refractory fibre as claimed in claim 1, wherein said amount of CaO is less than 20.03 mol % and said amount of MgO is less than 17.07 mol %.

12. The refractory fibre as claimed in claim 11, wherein said amount of CaO is approximately 15.39–19.68 mol %;

said amount of MgO is approximately 7.65–16.63 mol %;

said amount of $ZrO_2$ is approximately 1.7–9.15 mol %; and said amount of $SiO_2$ is approximately 62.25–68.91 mol %.

* * * * *

UNITED STATES PATENT AND TRADEMARK OFFICE
CERTIFICATE OF CORRECTION

PATENT NO. : 5,811,360
DATED : September 22, 1998
INVENTOR(S) : Gary A. Jubb

It is certified that error appears in the above-identified patent and that said Letters Patent is hereby corrected as shown below:

On the first page [63], after the word "abandoned" insert
--; filed as application No. PCT/GB93/00085, Jan. 15, 1993, abandoned--

Table 1, column 3, row 2, delete "349" and insert --34.9--

Column 6, line 37, delete "rail" and insert --fail--

Column 6, line 59, delete "18" and insert --1.8--

Column 7, line 36, delete "trend" and insert --tend--

Column 7, line 43, delete "BZ-42" and insert --BZ-421--

Column 7, line 66, delete "$Al_{2o3}$" and insert --$Al_2O_3$--

Column 29, line 67, insert --%-- after "mol"

Column 31, line 7, delete "an" and insert --any--

Column 31, line 15, delete "refractor" and insert --refractory--

UNITED STATES PATENT AND TRADEMARK OFFICE
CERTIFICATE OF CORRECTION

PATENT NO. : 5,811,360
DATED : September 22, 1998
INVENTOR(S) : Gary A. Jubb

It is certified that error appears in the above-identified patent and that said Letters Patent is hereby corrected as shown below:

Delete Table 2 (Columns 13-23) and Table 3 (Columns 25-30) and substitute the attached Table 2, Sheets 1-7, Pages 15-21 and Table 3, Sheets 1-7, Pages 22-28

Signed and Sealed this

Twenty-fourth Day of April, 2001

Attest:

NICHOLAS P. GODICI

*Attesting Officer*  *Acting Director of the United States Patent and Trademark Office*